April 14, 1964 J. E. KARLOVITZ ET AL 3,128,534
MULTI-STATION OPERATION WORKPIECE SUPPORTING APPARATUS
Filed April 4, 1960 6 Sheets-Sheet 3

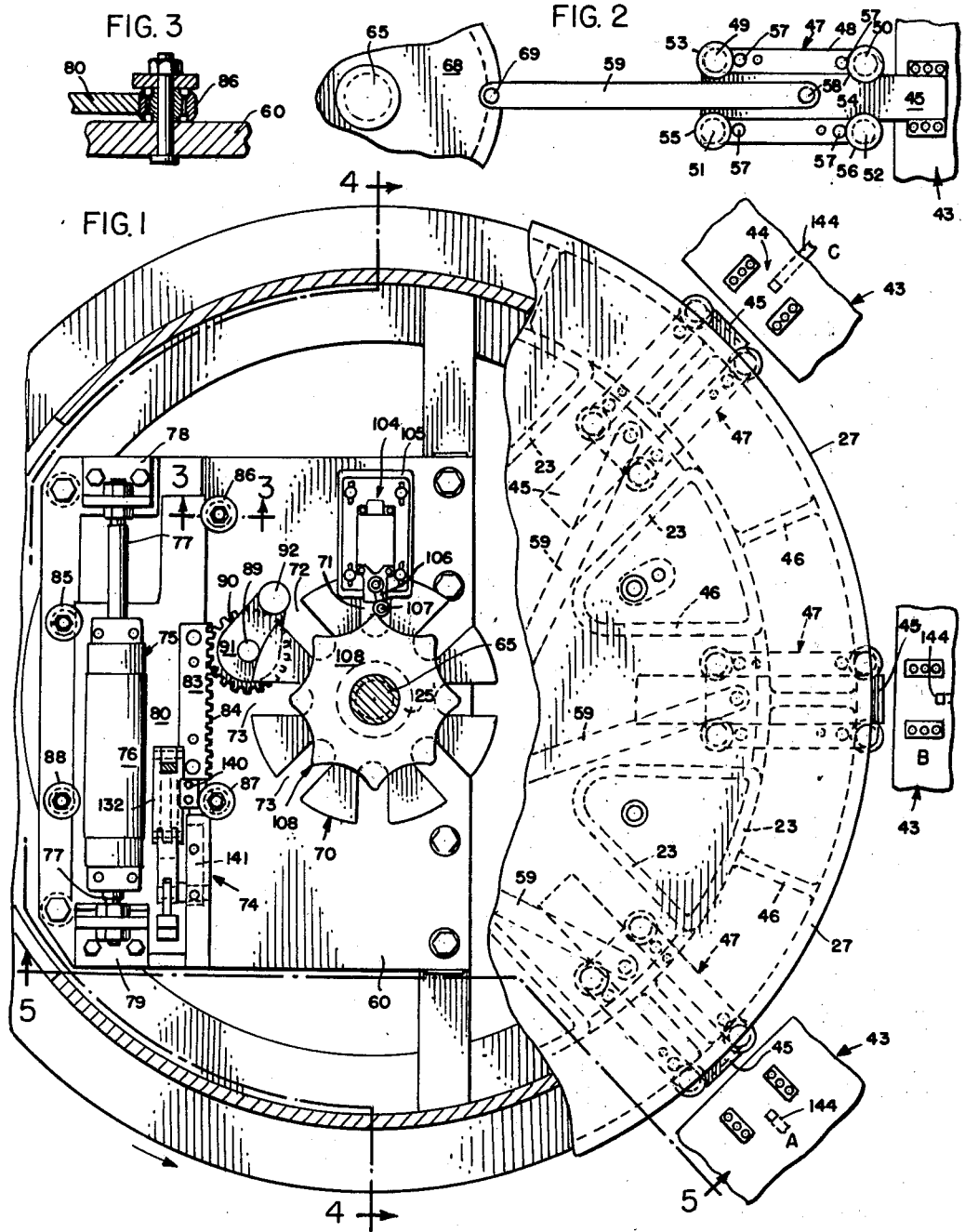

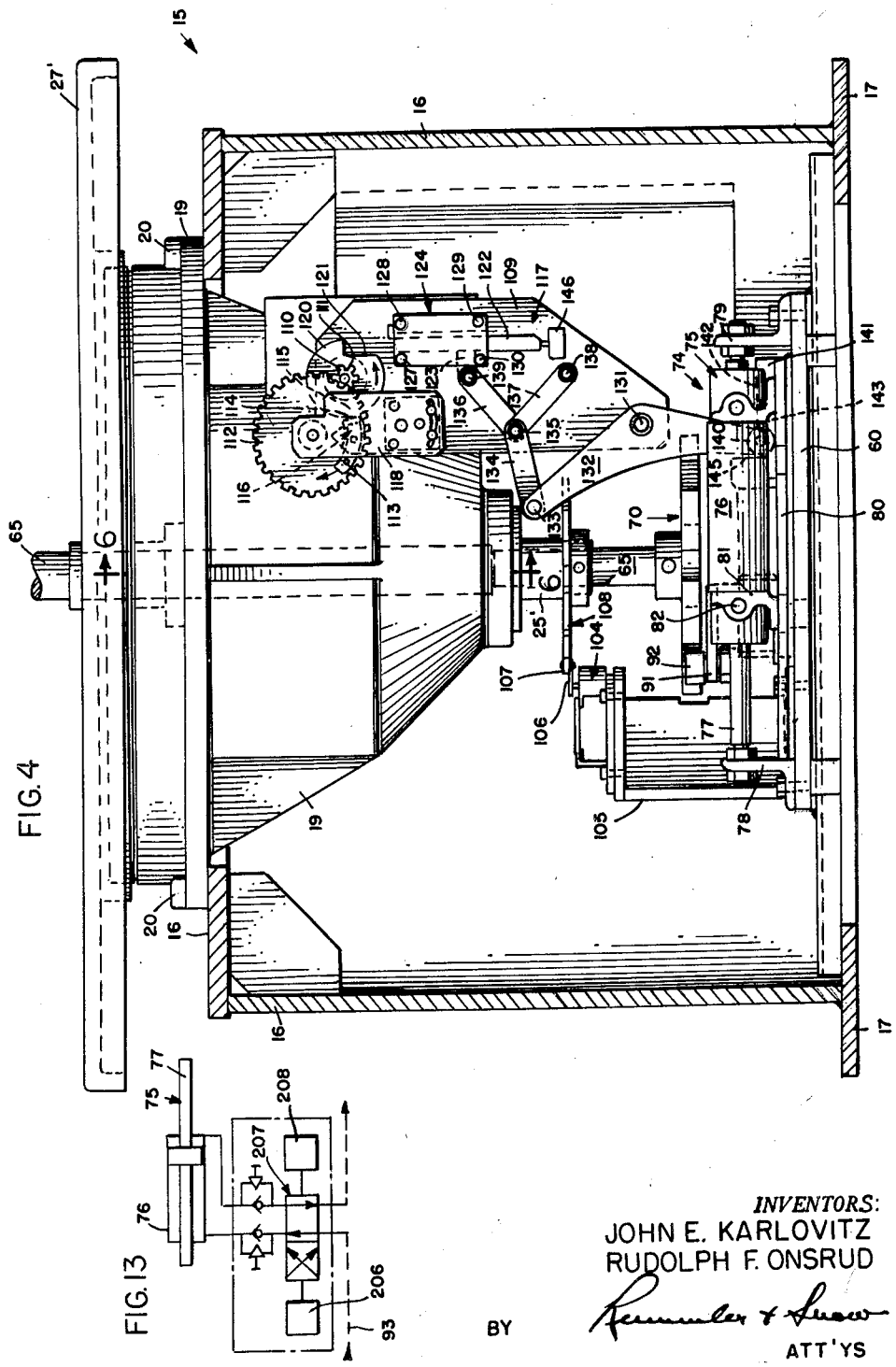

INVENTORS:
JOHN E. KARLOVITZ
RUDOLPH F. ONSRUD

BY

ATT'YS

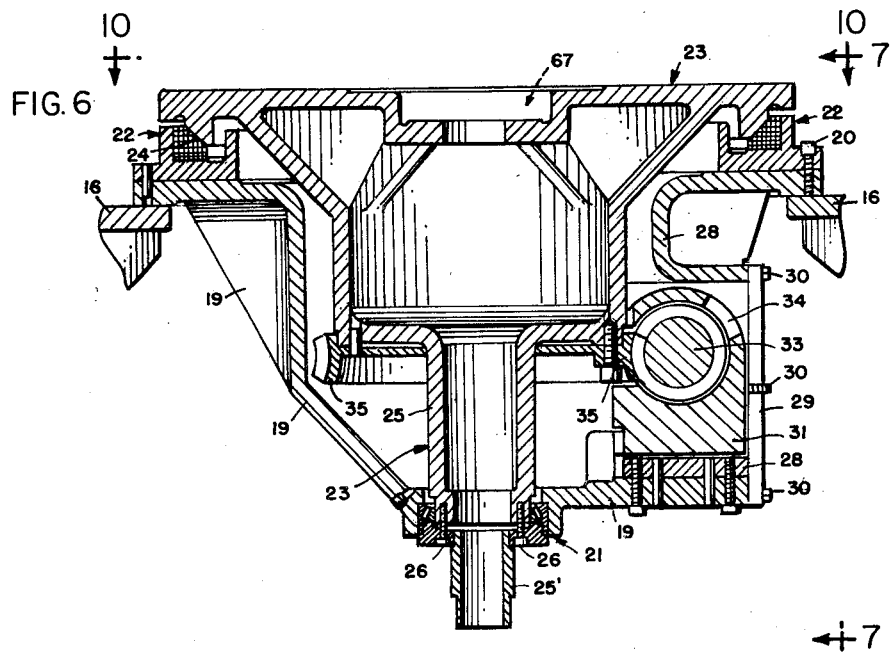
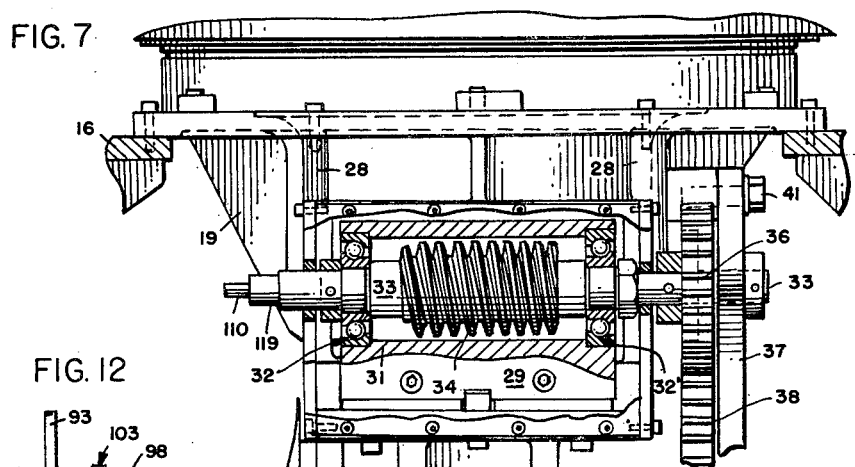
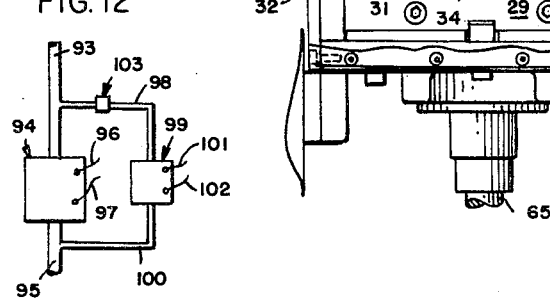
INVENTORS:
JOHN E. KARLOVITZ
RUDOLPH F. ONSRUD
BY *Ruemmler & Leow*
ATT'YS April 14, 1964 J. E. KARLOVITZ ET AL 3,128,534
MULTI-STATION OPERATION WORKPIECE SUPPORTING APPARATUS
Filed April 4, 1960 6 Sheets-Sheet 5
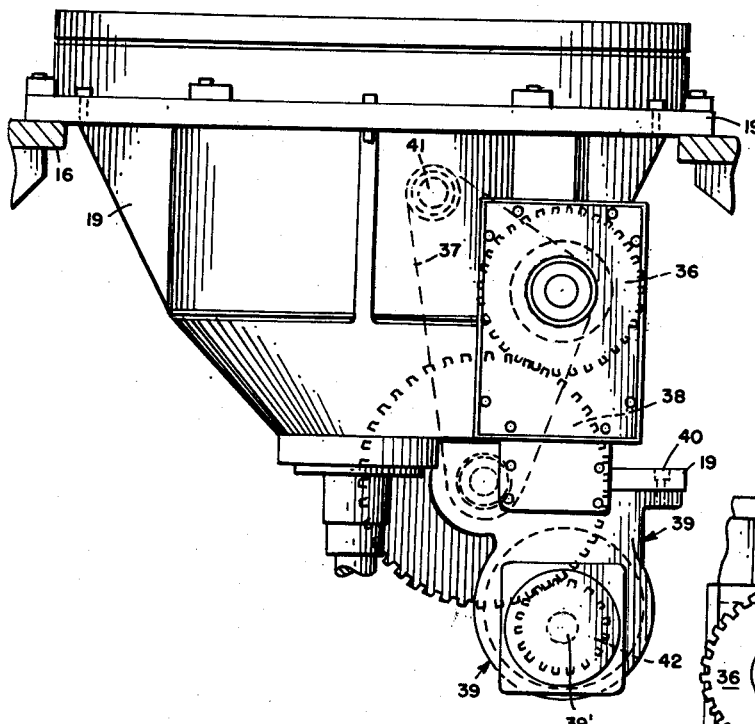
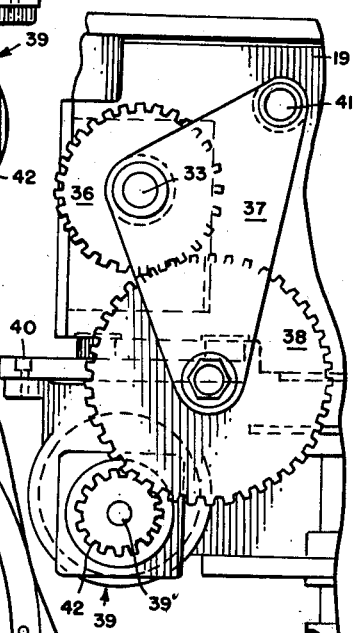
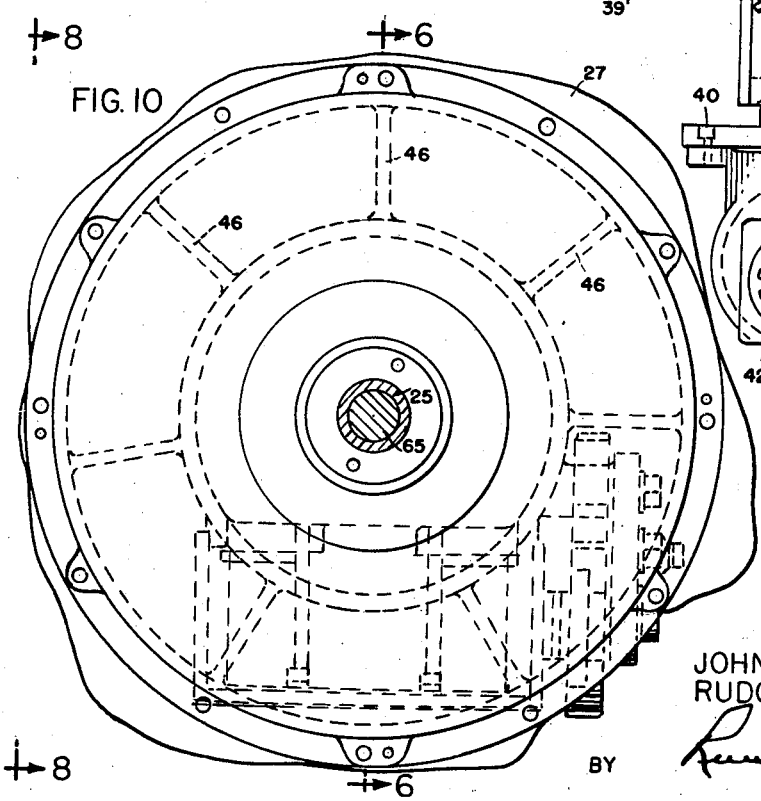
INVENTORS:
JOHN E. KARLOVITZ
RUDOLPH F. ONSRUD
BY
ATT'YS

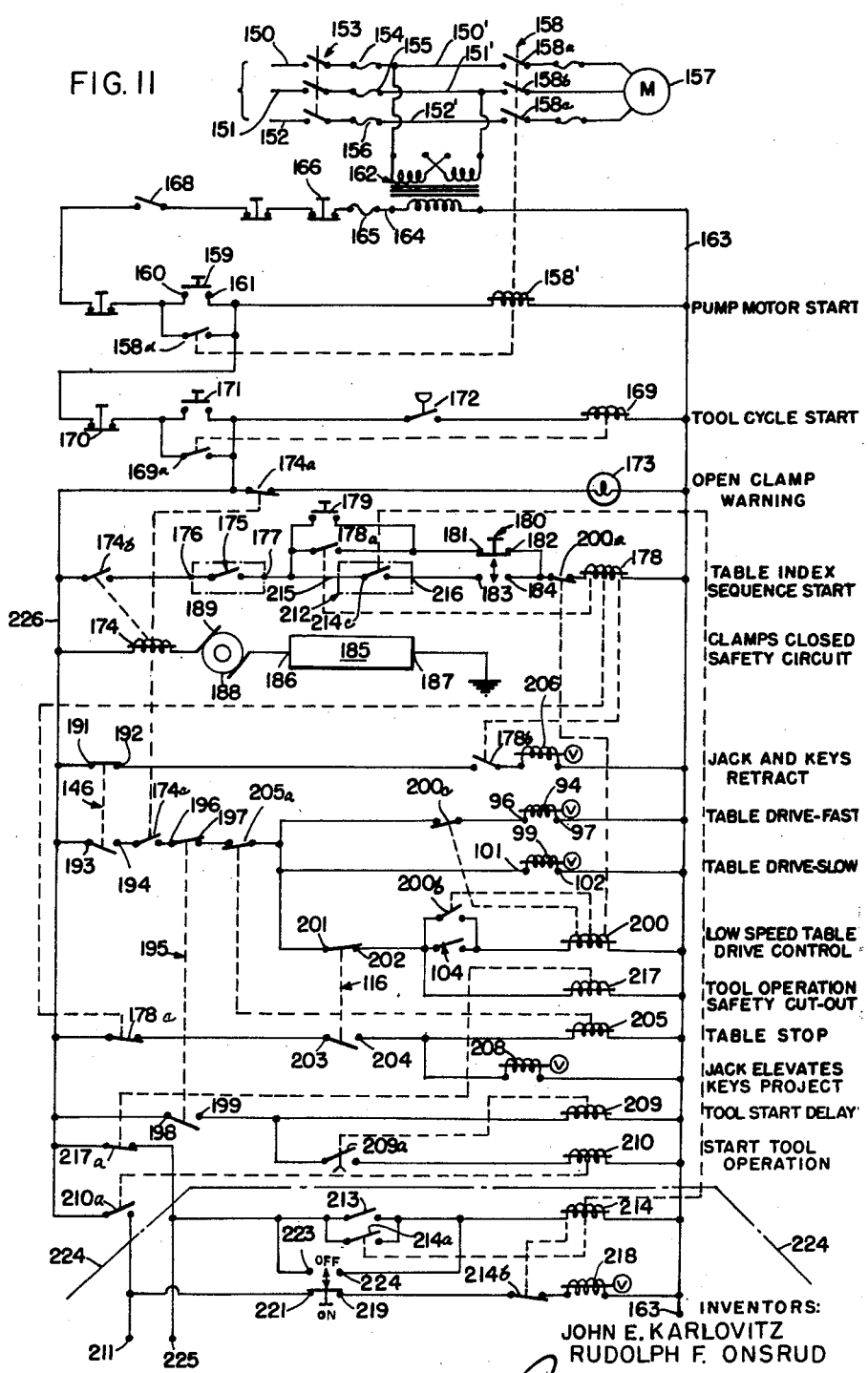

3,128,534
MULTI-STATION OPERATION WORKPIECE
SUPPORTING APPARATUS
John E. Karlovitz, Chicago, and Rudolph F. Onsrud,
Niles, Ill., assignors to Onsrud Machine Works, Inc.,
Niles, Ill., a corporation of Illinois
Filed Apr. 4, 1960, Ser. No. 19,670
11 Claims. (Cl. 29—38)

This invention relates to apparatus for movably supporting a workpiece and positioning the workpiece in indexed relation to each tool of a plurality of tools in sequential order. More in particular this invention relates to means for automatically moving a workpiece from an indexed relation with respect to one tool to an indexed relation with respect to another tool initially at high speed and then at low speed and then locking said tools to said apparatus in precision indexed relation.

Conventional apparatus for supporting a workpiece in pre-positioned indexed relation of the kind herein described comprised a table mounted rotatably on a stationary frame, the table being rotatable in stages and then locked to the frame in the tool operating position.

Each of the various tools were supported in rigid relation with respect to the aforesaid frame. The difficulty with this arrangement is that any variation of the tool position with respect to the frame resulted in that the desired precision of operation by the tool on the workpiece was not attained. Particularly in the case of small workpieces, such as for example certain components for cameras, projectors, microscopes and the like, a very high order of precision operations are required and thus conventional apparatus is unsatisfactory. Furthermore, in conventional apparatus the movement of the workpiece supporting table between one tool and the next tool was slow and thus the production rate was correspondingly low.

It is a prime object of this invention to provide a workpiece supporting apparatus which locks the movable table thereof in indexed relation directly to the tools for providing precise position of the workpieces with respect to the tools.

A further object of the invention is to provide a workpiece supporting apparatus which shifts the movable table thereof to move the workpiece from one tool position to another tool position first at high speed and then at low speed for increasing the rate of production of finished workpieces.

A still further object of this invention is to provide means for shifting the workpiece from one station to the next succeeding station whereby the workpiece is positioned at precisely a fixed point with reference to its adjacent tool.

A yet further object of this invention is to provide means for shifting slightly each tool and locking said tools to the workpiece supporting apparatus in precise fixed relation.

Another important object of this invention is to provide a jack mechanism for controlling precisely the movement of a movable table supporting a workpiece with respect to its supporting frame.

Still another important object of the invention is to provide means for alining a workpiece to an operating tool precisely in locked relation.

A further object of this invention is to provide automatic means for shifting a workpiece precisely in accordance with the preceding objects.

These and other important and desirable objects encompassed by the invention will become apparent from the ensuing description of a preferred embodiment thereof, the appended claims and the annexed drawings wherein:

FIGURE 1 is a plan view taken on line 1—1 of FIGURE 5, partly broken away and partly in section illustrating the assembly of one power means for locking the movable supporting table with respect to the operating tools.

FIGURE 2 is a plan view taken on line 2—2 of FIGURE 5, partly broken away, illustrating one locking key assembly for deflecting and locking an operating tool to the workpiece supporting table.

FIGURE 3 is a side view in section and partly broken away taken on line 3—3 of FIGURE 1 showing a roller guide assembly adapted to accommodate a laterally movable element of one power means for locking the workpiece supporting table with respect to the operating tools.

FIGURE 4 is a sectional view taken on line 4—4 of FIGURE 1 illustrating the general arrangement of the jack mechanism and one power means in actuating relation for precisely fixing the table with respect to its supporting frame.

FIGURE 6 is a sectional view partly broken away taken on line 6—6 of FIGURES 4 and 10 illustrating the construction of table supporting member or stem and drive means for rotating same.

FIGURE 7 is a right angle view with respect to FIGURE 6 and taken on line 7—7 of FIGURE 6, in section and partly broken away, showing the worm wheel drive mechanism for rotating the workpiece supporting table.

FIGURE 8 is a side view, partly in section and partly broken away, taken on line 8—8 of FIGURES 5 and 10 illustrating another driving assembly for rotating the workpiece supporting table.

FIGURE 9 is a fragmentary view taken on line 9—9 of FIGURE 5 showing the assembly arrangement of the drive gearing for rotating the workpiece supporting table.

FIGURE 10 is a plan view partly in section and partly broken away with the table removed showing the general arrangement of the drive mechanism with the stem and circular table base, taken on line 10—10 of FIGURE 5.

FIGURE 11 is a schematic drawing illustrating the electrical control system for controlling both power means is sequential relation.

FIGURE 12 is a schematic drawing illustrating the hydraulic and electrical circuit in part for controlling fast and slow speed rotation of the table.

FIGURE 13 is a schematic drawing illustrating the hydraulic and electrical circuits in part for controlling an hydraulic ram.

Figure 5:
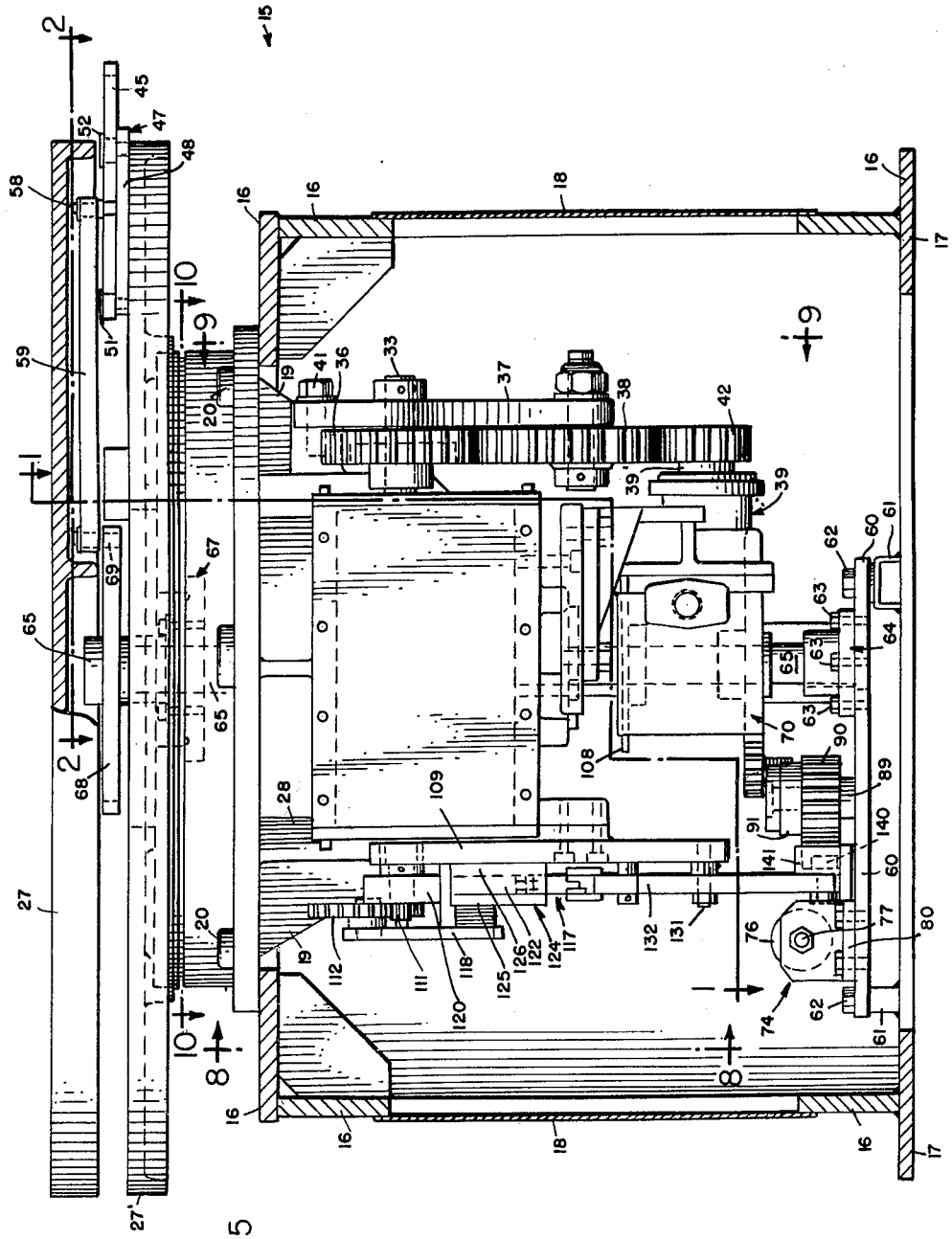
FIGURE 5 is a sectional view partly broken away taken on line 5—5 of FIGURE 1 illustrating the assembly of the components for moving the workpiece supporting table. It will be noted that this view is taken at right angle with respect to that of FIGURE 4 and the jack mechanism of FIGURE 4 being omitted.

With continued reference to the drawings it will be seen from FIGURES 4 and 5 the numeral 15 indicates generally the multi-station operation workpiece supporting apparatus of this invention. The apparatus 15 comprises a supporting frame 16 which at the bottom 17 thereof may be rigidly connected to the floor of a room. The frame 16 may be provided with vertical openings covered by removable panels 18 to provide means for access to the interior for servicing the various components of the apparatus 15. The frame 16 also includes a bearing support member 19 of tapered and hollow construction as best viewed in FIGURES 4, 6 and 8 which is rigidly connected to the frame 16 such as by bolts two being shown in FIGURE 4 at 20. Referring now to FIGURE 6 the bearing support member 19 is provided with a bearing indicated at 21 on the lower portion thereof and a ring bearing indicated at 22 on the upper portion thereof. Mounted for rotation on the bearings 21 and 22 is a stem generally indicated at 23 wherein the upper portion thereof is supported by the ring bearing 22 with its friction surface 24 comprising conventional bearing metal such as bronze, babbitt or the like, and the lower portion of the stem 23 being of hollow shaft construction 25 supported by the bearing 21. The bearing 21 may conveniently be comprised of a conventional roller bearing. The hollow shaft 25 is extended below the lower end of shaft 25 by an extension hollow shaft 25' secured to the shaft 25 as by bolts shown in FIGURE 6.

Referring back to FIGURE 4, secured to the top surface of the stem 23 is a circular table base 27'. Thus the table base 27' rotates with the stem 23 and hollow shafts 25 and 25' thereof. Means for rotating the table base 27' by power will now be described.

Referring to FIGURES 6 and 7, it will be seen that rigidly connected to the frame 16 is a bracket 28 forming a generally rectangular shaped opening covered by a plate 29 secured to the bracket 28 such as by a plurality of screws 30 in threaded relation. Disposed within the opening of the bracket 28 is a worm wheel bearing block 31. The block 31 is of a hollow construction having ball-bearing members 32 and 32' disposed in horizontal alinement as best shown in FIGURE 7. Disposed within the block 31 in horizontal relation and constrained for rotation in the bearings 32 and 32' is a worm shaft 33. Centrally disposed within the block 31 and constrained for rotation with the shaft 33 is a worm-wheel 34. Now referring back to FIGURE 6 it will be seen that the stem 23, in secured relation to the hollow shaft 25, is provided with a worm gear 35 positioned in meshed relation with the worm wheel 34. Thus it is apparent that rotation of the worm shaft 33 and worm wheel 34 drivingly rotates the stem 23 and circular table base 27'.

Referring now to FIGURE 7 the worm shaft 33 projects laterally beyond the confines of the bracket 28. As viewed in FIGURE 7 on the rightward end projection of the worm shaft 33 is secured to a pinion gear 36. As best seen in FIGURES 5, 7 and 9, there is secured to the bearing support member 19 of the frame 16, in depending relation, a stationary drive gear support 37 in journalled relation with the worm shaft 33. The drive gear support 37 may be connected to the support 19 by a bolt 41 which together with its journalled relation to the worm shaft 33 maintains it in fixed stationary relation. An idler gear 38 is also rotatably supported by the drive gear support 37 in meshed relation with the pinion gear 36. Mounted rigidly to the bearing support member 19 of the frame 16 below the bracket 28 (FIGURE 6) is a conventional hydraulic motor generally indicated at 39 as best shown in FIGURES 5, 8 and 9. The motor 39 is of the type having a rotatable driving element 39' and may conveniently be connected to the support member 19 such as by bolts one of which is shown at 40 in FIGURES 8 and 9. The rotatable driving element 39' of the hydraulic motor 39 is provided with a gear wheel or pinion 42 in meshed relation with the idler gear 38. Thus it is apparent that when the hydraulic motor 39 is energized it drivingly rotates the stem 23 and its associated table base 27'. From this it is clear that a power means has been described and illustrated for drivingly rotating the table base 27'. The rotatable work table 27 is secured to the circular table base 27' (FIGURE 5) in rigid relation by conventional means such as by bolts (not shown). Thus the table 27 moves with the circular table base 27'.

In the present embodiment it will be seen from FIGURE 1 that disposed peripherally about the table 27 in 45° spaced relation are seven operating tool stations of which 3 are shown. The position corresponding to an eighth station is unoccupied by a tool, the position being provided for an operator to remove finished work-pieces and inserting blank workpieces as will be described later herein. Three of the 7 tool positions, A, B and C are shown in FIGURE 1. The operating tools are of various types such as power drills, power grinders, power reamers, power tapping tools and the like and may be placed in any desired order depending upon the work to be done on each workpiece. An example of one such power tool 43 is described and illustrated in detail in copending application Serial No. 776,572 filed November 26, 1958, now Patent No. 2,944,445, and assigned to the same assignee herein. For the purpose of the present invention the necessary portion of one operating tool will be described, it being understood that the other operating tools possess the same common characteristics. Referring again to FIGURE 1 at operating station C there is indicated at 43 a power operating tool 43 which is supported from the room floor independently of the apparatus 15 on a conventional pedestal and positioned approximately to engage a workpiece (not shown) at station C clamped to the table 27 by suitable conventional clamping devices (not shown). It will be noted that when the operating tool 43 is so mounted, it can be moved slightly in a generally horizontal direction through flexure of its supporting pedestal (not shown). Of course it should be understood that other means may be provided for permitting the operating tool 43 to move slightly in a horizontal direction such as by a suitable spring loaded mounting which allows slight movement of the tool 43. Each tool 43 is provided with a keyway or slot 44 adapted to receive slidably a locking key 45 which locking key is mounted in the table 27 and is projectable and retractable therefrom as will be described later herein. In FIGURE 1 each of the locking keys 45 are shown in retracted position wherein the slots 44 of each operating tool 43 is disengaged therefrom. FIGURE 2 illustrates one key 45 in projected position. Thus as the locking keys 45 are projected from a retracted position, the tools 43 may be forcibly moved slightly in the lateral direction so that when the keys 45 are fully projected as shown in FIGURE 2, each of the tools 43 is positioned in exact alinement with its corresponding station on table 27. Thus the tools 43 are positioned precisely with respect to the various operating stations of the table 27 regardless of any slight error in the indexing of the table or the intial position of the tool. From FIGURE 1 it may be seen that the table 27 is provided with eight locking keys 45 each spaced at 45° from its adjacent locking key. One such locking key 45 will now be described, it being understood that each of the eight locking keys 45 are constructed similarly.

Referring to FIGURE 5 it will be seen that the circular table 27 also includes the above described circular table base 27' secured to each other by spacer ribs 46 illustrated in dotted lines in FIGURE 1 and bolts (not shown). Mounted on the outer portion of the circular table base 27' is a roller guide indicated at 47 in FIGURES 1, 2 and 5. Referring now to FIGURES 2 and 5 the roller guide is comprised of a plate 48 of generally rectangular shape having short stub shafts 49, 50, 51 and 52 projecting upwardly from the corner portions thereof. Each stub shaft is provided with a roller 53, 54, 55 and 56 respectively as shown in FIGURE 2. The rollers 53 to 56 are spaced apart to accommodate and firmly hold the locking key 45 against lateral movement, but such that the key 45 may be moved radially in the guide 47, as may be evident from FIGURES 1 and 2. The plate 48 of the guide 47 may conveniently be secured to the circular table base 27' by a plurality of rivets 57.

Again referring to FIGURES 2 and 5 the locking key 45 is provided with an upwardly extending pin 58 for pivotal connection to the outer end of an arm 59. Thus it is evident that movement of the arm 59 in a generally radial direction results in precise radial movement of the locking key 45.

Referring now to FIGURE 5 at the lower portion thereof is a stationary base plate 60 rigidly connected to the frame 16 by channel brackets, two of which are shown at 61, secured conventionally as by bolts, two of which are shown at 62. Secured to the base plate 60 by bolts 63 is a conventional thrust bearing indicated at 64 positioned in axial alinement with table 27 and hollow shafts 25 and 25' previously described. A vertical shaft 65 is seated in the thrust bearing 64 and extends upwardly through the hollow shafts 25 and 25' and the circular table base 27' as best shown in FIGURES 4 and 5. The top of the stem 23 is provided with a bearing indicated at 67 (FIGURE 5) to accommodate relative rotational movement of the shaft 65 with respect to the stem 23 and tables 27 and 27'. Secured to the upper end portion of the shaft 65 is a disc 68. The disc 68 is provided with a series of eight upwardly extending pins 69 near the periphery thereof spaced at 45° intervals, one of which is illustrated in FIGURES 2 and 5. The inner ends of each of the arms 59 are respectively connected pivotally to each of the pins 69 of the disc 68. From this it can be readily seen that when the vertical shaft 65 is rotated a few degrees with respect to the tables 27 and 27' the locking keys 45 are simultaneously moved in a radial direction and when the disc 68 is moved to dead center position the locking keys 45 are fully extended as shown best in FIGURES 2 and 5. When the shaft 65 and disc 68 are rotated with respect to the tables 27 and 27' in either direction away from the dead center position illustrated the locking keys 45 are simultaneously moved retractively in the roller guides 47 and thereby withdrawn from engagement with the corresponding operating tools 43. From this it can be seen that when the locking keys 45 are retracted from the operating tools 43 as in FIGURE 1 the table 27 carrying the workpieces may be rotated. To the contrary when the locking keys 45 are in the projected position illustrated in FIGURES 2 and 5, the table 27 may not be rotated for it is locked in alinement with each of the operating tools 43. The means for actuating the above described locking key mechanism will now be described.

Referring now to FIGURES 1, 4 and 5 there is affixed to the vertical shaft 65 a slotted wheel commonly referred to as a "Geneva wheel" indicated at 70. It will be noted from FIGURE 1 that the Geneva wheel 70 is provided with a plurality of notches radially spaced at 45° intervals, four of these notches being at 71, 72, 73 and 73'. The power transmission mechanism, generally indicated at 74, for moving rotatably the Geneva wheel 70 with respect to the table 27 for actuating the projecting and retracting of the locking keys 45 is in accordance with the following discussion.

It will be seen from FIGURES 1, 4 and 5 that the power transmission mechanism 74 is supported by the stationary base plate 60. The power unit of the mechanism 74 comprises a double acting hydraulic ram indicated at 75 having a movable casing 76 and a stationary connecting rod 77 attached to a conventional piston within the casing 76. It will be noted that the connecting rod 77 extends through both ends of the casing 76, both ends being anchored to the base plate 60 by brackets 78 and 79 as best shown in FIGURES 1 and 4. Directly beneath the casing 76 of the ram 75 is a shoe 80 which is slidable on the upper surface of the base plate 60. The shoe 80 is provided with a bracket 81 which may be pivotally connected to the casing 76 at 82 as best shown in FIGURE 4. From this it can be seen that when the hydraulic ram 75 is energized conventionally in either direction the shoe 80 moves horizontally with the casing 76 of ram 75.

On the inner side of the shoe 80, best shown in FIGURE 1, is mounted in rigid relation a rack member 83 having the teeth 84 thereof projecting outwardly from the shoe 80. Now in order to guide the movement of the shoe 80 in a linear path, four guide rollers 85, 86, 87 and 88 are mounted on the base plate 60 one of which is shown in detail in FIGURE 3. Thus the movement of the shoe 80 is confined to a linear path. An upwardly extending stub shaft 89 (FIGURES 1 and 5) is mounted on the base plate 60 for supporting rotatably a cog-wheel 90 positioned in meshed relation with the rack 83. Thus reciprocating movement of the casing 76 imparts rotational movement to the cog wheel 90 first in one direction and then in the opposite direction.

Mounted rigidly on the top of the cog wheel 90 is a crank comprising a crank arm 91 having an upwardly extending crank pin 92 of a diameter sufficient to engage slidably any of the notches (e.g. 71, 72, 73, and 73') in the Geneva wheel 70. From the position in FIGURE 1 it can be seen that when the ram 75 is energized in a leftward direction (FIGURE 4) the cog wheel 90 is rotated in a clockwise direction as viewed in FIGURE 1 so that the crank pin 92 engages in the notch 72 and moves the Geneva wheel 70 in a counter-clockwise direction as shown, the stroke of the ram 75 is such as to rotate the crank 91 a sufficient distance to turn the Geneva wheel 70 approximately 45° thereby fully actuating the locking keys 45 projectively. At this point it is important to note that when the ram 75 is in the position shown in FIGURE 1 the crank pin 92 is slightly beyond the outer periphery of the Geneva wheel 70. This position of the crank pin 92 permits rotation of the Geneva wheel with the table 27 as each workpiece is advanced from one operating station to the next operating station. Thus when the casing 76 of the ram 75 is in the position shown in FIGURE 1, the crank pin 92 is in complete disengagement with respect to the Geneva wheel 70 and the locking keys are in retracted position. Rotational movement of the table 45° in a counterclockwise direction as viewed in FIGURE 1 moves the notch 72 of the Geneva wheel to the position shown at 73 for subsequent engagement of the crank pin 92 with the next succeeding notch (i.e. 71) to again project keys 45. From the above it can be seen that as the hydraulic ram 75 is energized to move the casing 76 from the extreme rightward position (FIGURE 4) to its extreme leftward position the crank pin 92 will move the Geneva wheel about 45° in a counter-clockwise direction thereby projecting the locking keys 45 into the slots 44 of the operating tools 43. Since the crank pin 92 is then engaged with a notch (e.g. 72) of the Geneva wheel 70 the table 27 may not be moved but is in locked relation with the tools 43 because the locking keys 45 are projected. Then subsequently when the ram 75 is energized in the opposite direction (i.e. from left to right as viewed in FIGURE 4) the crank pin 92 returns the Geneva wheel 70 to the first position shown in FIGURE 1. This return movement of the crank pin 92 to the position shown in FIGURE 1 rotates the Geneva wheel 70 in a clockwise direction thus actuating the locking keys 45 retractively for disengaging the table 27 from the operating tools 43. Thus it will be noted that the locking keys 45 are first projected and then retracted from the operating tools 43, the table 27 is then rotated counter-clockwise (FIGURE 1) and the locking keys 45 are again projected into engagement with the operating tools 43. It will also be noted that movement of the table 27 advances each workpiece to the next succeeding operating station. In addition it should be noted that the table 27 is not locked by the keys 45 to the frame 16 but is locked directly to each operating tool 43. Thus each operating tool 43 must necessarily be in precise position with respect to workpieces mounted on the table 27. It will be shown later than in the event of failure of the locking keys 45 to become fully projected all of the operating tools 43 are automatically rendered inoperative. Thus one of the more important construction features of the invention for providing precise alinement of the operating tools 43 with respect to the workpieces mounted on the table 27 has been shown and described.

As previously described the rotation of the table 27 and stem 23 is accomplished under power by means of the hydraulic motor 39 and its associated drive mechanism. One of the important features of this invention is that when the table 27 moves counter-clockwise as viewed in FIGURE 1 to shift each workpiece to the next tool operating station, the speed of rotation of the table is high until the table has been moved about 35° at which point the fluid under pressure to the hydraulic motor 39 is throttled downward thereby reducing the speed of rotation of the table 27 to a predetermined slow rate until it reaches about 45°. When movement of the table 27 has progressed at slow speed to approximately 45° the source of fluid under pressure to the hydraulic motor 39 is terminated.

One means for controlling the rate of flow of fluid under pressure to the hydraulic motor 39 is shown in FIGURE 12. The source of fluid under pressure (not shown) is communicated to the inlet conduit 93, through a large conventional solenoid actuated hydraulic valve indicated at 94, to the outlet conduit 95. The valve 94 is actuated to opened position by energizing the solenoid thereof electrically through conductor leads 96 and 97. A by-pass hydraulic circuit with respect to the valve 94 is formed by a small inlet conduit 98 in communication with the conduit 93 and leads to the inlet side of a small conventional solenoid actuated hydraulic valve indicated at 99. The outlet side of the valve 99 is connected communicatively to the conduit 95 by a small outlet conduit 100. The conduit 95 is communicatively connected to the inlet side of the hydraulic motor 39 (not shown). The valve 99 is actuated to opened position by energizing the solenoid thereof, independently of valve 94, electrically through conductor leads 101 and 102. From this it is apparent that when both valves 94 and 99 are electrically energized, the fluid under pressure from the source thereof is communicated to the hydraulic motor 39 at full flow. When valve 94 is electrically de-energized thus closing valve 94 and the valve 99 is electrically energized the flow of fluid under pressure is limited to the by-pass circuit through valve 99, thus reducing correspondingly the speed of the hydraulic motor 39. For purpose of adjusting the rate of fluid flow through the by-pass circuit, a small conventional needle valve indicated at 103 may conveniently be interposed in the by-pass circuit as shown in FIGURE 12.

The control of operation of the large solenoid actuated valve 94 is by means of a cam operated electric switch 104 best shown in FIGURES 1 and 4 conventionally connected to a source of electric energy as indicated in FIGURE 11. The limit switch 104 is mounted on the upper end of a bracket 105 secured to the base plate 60 in stationary relation as best seen in FIGURE 4. The switch 104 is of the spring loaded type wherein the spring urges the actuating lever 106 thereof toward a normally open (electrically) position. The outer end of the lever 106 is provided with a small roller 107 positioned to engage the lobes or nobs of a cam or star wheel indicated at 108. Thus when the roller 107 is engaged by a lobe of the star wheel 108 the switch 104 closes an electrical circuit which in turn actuates a relay to open the circuit to the large solenoid actuated valve 94. The valve 94, thereupon being de-energized, terminates the flow of hydraulic fluid therethrough. Thus any movement thereafter of the hydraulic motor 39 is limited to the by-pass hydraulic circuit of FIGURE 12 as long as the small solenoid valve 99 remains energized to its open position. The control of the small and large solenoid valves 94 and 99 will be explained later herein.

The star wheel 108 is mounted on the extension 25' of the hollow shaft 25 of the stem 23. Thus the star wheel 108 rotates with the stem 23 and table 27. It should be noted however that the star wheel 108 is provided with eight peripheral nodes spaced apart at 45° corresponding to the positions of the tool operating stations. The position of the limit switch 104 with respect to the star wheel 108 is adjusted so that at each time when the table 27 is rotated 45° the normally open switch 104 will be closed by a node when the table 27 has moved the initial 35°. Means will now be described for controlling the table 27 at slow speed, beginning at the point when the table 27 has already moved about 35° at high speed and the last 10° movement is being made, whereupon at precisely the 45° position the table 27 stops and is locked against further rotation relative to the frame 16 by the worm wheel 34.

Referring now to FIGURES 4 and 5 it will be seen that there is a vertical mounting plate 109 rigidly connected to the frame 16 through the bracket 28 (FIGURE 6) and one end of the housing supporting the worm-wheel 34. The worm shaft 33 extends through the mounting plate 109 in rotatable relation, the outer end thereof being of reduced diameter at 110 (FIGURE 7) and secured to a small pinion gear 111 as best seen in FIGURE 4. Mounted in journalled relation to the plate 109, in meshed relation with the pinion 111, is a cam gear 112. Thus rotation of the worm shaft 33 rotates the cam gear 112. The ratio of the teeth of the pinion 111 to the cam gear 112 is selected so that when the worm wheel 34 rotates the table 27 angularly 45° the cam gear 112 rotates one complete revolution precisely. As viewed in FIGURE 4 the cam gear 112 on the outer face thereof is provided with a cam 113 having its camming surface sloping in an axial direction. The camming surface of the cam 113 projects outwardly at 114 and recedes progressively toward the outer face of the cam gear 112 at 115.

Mounted on the small vertical plate 118, which is secured to plate 109 in spaced relation, is another conventional limit switch, shown in dotted lines at 116 of FIGURE 4, having the actuating lever and roller thereof positioned in operative relation with respect to the cam 113. The switch 116 is a double throw switch having two sets of contacts and is also spring loaded, similar to switch 104, whereby the spring thereof urges the switch in a direction for engagement with cam 113 and at the same time holds one set of contacts closed. Thus as the cam gear 112 moves clockwise as shown in FIGURE 4, the cam 113 engages the actuating lever of the switch 116. When the roller of the actuating lever of the switch 116 reaches the projecting surface 114 of the cam 113 the switch 116 is actuated. The switch 116 is connected electrically to operate a relay which in turn deenergizes the small solenoid actuated valve 99 (FIGURE 12) and closes the by-pass 98–100. From this it can be seen that if the cam 113 is located on the cam gear 112, corresponding to the position of the table 27, after it has moved about 35° toward the 45° position, by proper adjustment of the position of switch 116 it will function to de-energize the small solenoid valve 99 (FIGURE 12) when the table 27 has accomplished approximately 45° of rotation. At that time both solenoid valves 94 and 99 will then be closed thus terminating operation of the hydraulic motor 39.

Now it can be appreciated that while the control of the operation of the hydraulic motor 39 will rotate the table 27 approximately 45° from station to station such control is not sufficiently precise for purposes of this invention. Therefore, for positioning the table 27 at precisely 45°, for alinement with the operating tools 43, means for a final vernier movement of the table 27 will now be described.

Mounted on the vertical plate 109 is a jack mechanism generally indicated at 117 as best seen in FIGURES 4 and 5 which functions to position the worm shaft 33 and its associated worm wheel 34 so that the table 27 is moved precisely to the 45° position and simultaneously locks the worm wheel 34 against further rotation. If the table 27 is not in the exact 45° position when the motor 39 is stopped the jack mechanism serves to move the table 27 a fraction of a degree in rotation to position it precisely at 45°.

It will be seen from FIGURES 4 and 5 that secured to a reduced diameter portion 119 (FIGURE 7) of the worm shaft 33 adjacent to the small pinion gear 111 is disc wheel 120 having a peripheral notch 121 providing a radial shoulder adapted to receive engagingly the rectangularly shaped upper end of a lever element 122. The lever element 122 also includes a laterally projecting ear 123 and is supported for limited vertical sliding movement by a guide block indicated at 124. The guide block 124 is comprised of pair of rectangularly shaped plates 125 and 126 (FIGURE 5) laterally spaced apart by spacers 127, 128, 129 and 130 (FIGURE 4) in proper spaced relation to permit the lever element 122 to slide vertically therein as best seen in FIGURE 4. It will be noted that the spacers 127 and 130 also function as stop means in respect to the ear 123 for limiting the vertical movement of the lever element 122. The guide block 124 is positioned so that when the lever element 122 is elevated it may engage the notch 121 of the disc wheel 120 in close but slidable relation to fix the disc wheel 120 in the position shown in FIGURE 4 which is the necessary position for precisely adjusting, rotationally, the table 27 at exactly 45° of angular movement with respect to the frame 16 for proper alinement with the operating tools 43.

Pivotally connected at 131 to the vertical plate 109 is a rock arm 132, best shown in FIGURES 4 and 5. The upper leg of the rock arm 132 is pivotally connected at 133 to one end of a link member 134, and the other end of the link member 134 is pivotally connected at 135 to the leftward ends of a pair of link elements 136 and 137. It is to be noted that the links 134, 136 and 137 are not pivotally connected at 135 to the vertical plate 109 for reasons evident later herein. The rightward end of the link element 137 is pivotally connected at 138 to the vertical plate 109 while the rightward end of link element 136 is pivotally connected at 139 to the outer projecting end portion of ear 123 of the lever element 122. In the position shown in FIGURE 4 the rock arm 132 is in its extreme counter-clockwise position. When the rock arm 132 is rocked clockwise about its pivot 131, the link member 134 moves rightwardly resulting in that the link element 137 moves clockwise about its pivot 138. This movement of the link element 137 moves the pivot connection 135 arcuately to the right about the pivot 138. The arcuate movement of the pivot connection 135 in a generally rightward direction moves the lower end of link element 136 arcuately. Since the pivot connection 139 of the upper end of the link element 136 may only move vertically because it is connected to the ear 123 of the lever element 122, the link element 136 drives the lever element 122 upwardly and vertically. The upper end of the lever element 122 in turn elevates to engage the shoulder of the notch 121 of the disc wheel 120 thereby locking it into the position illustrated in FIGURE 4. Now if the notch 121 of the disc wheel 120 is slightly out of the position shown in FIGURE 4 the lever element 122 upon engagement with the radial shoulder of the notch 121 will rotate the disc wheel 120 and its associated worm shaft 33 to the position shown in FIGURE 4. At this point it should be stated that the control of the hydraulic motor 39 previously explained is sufficiently accurate so that the disc wheel 120 always stops at a position whereby the lever element 122 may engage operatively on the radial shoulder of the notch 121. From this it can be seen that the jack mechanism 117 not only positions rotatively the disc wheel 120 but also when the lever element 122 is in engaged relation in the notch 121 it functions to lock the worm shaft 33 and worm wheel 34 against rotation. This in effect locks the table 27 from any rotational movement with respect to the frame 16. By means of the jack mechanism 117 thus explained the table 27 is positively adjusted and locked into its 45° indexed position with an accuracy of less than 10 seconds of one degree of rotation which for purposes herein is considered within the term "precise." The means for actuating the rock arm 132 will now be explained.

Referring again to FIGURES 1, 4 and 5 the lower leg of the rock arm 132 is provided with a roller 140. In horizontal alinement for engagement with the roller 140 is a cam 141 mounted rigidly on the top surface of the shoe 80. The camming surfaces of the cam 141 is comprised of a horizontal surface 142 on the rightward portion as seen in a partly dotted line in FIGURE 4 and a sloped surface 143 on the leftward portion. Now as the movable casing 76 of the hydraulic ram 75 moves leftwardly (FIGURE 4) the roller 140 rides upwardly along the sloped surface 143 of the cam 141 and thereafter rides on the horizontal surface 142. As the roller 140 rides upwardly on the sloped surface 143 of the cam 141 the rock arm 132 is rotated clockwise which in turn actuates the jack mechanism 117 to position the disc wheel 120 precisely and at the same time locks it against further rotation as previously explained. When the roller 140 reaches the horizontal surface 142 of the cam 141 no further rotational movement of the rock arm 132 occurs as the jack mechanism 117 is already in complete engagement. At this point it will be noted that when the hydraulic ram 75 is first energized to move its associated casing 76 in a leftward direction as viewed in FIGURE 4, it first accomplishes complete actuation of the jack mechanism 117 before it actuates movement of the Geneva wheel 70 for projecting the locking keys 45 into the operating tools 43 in the manner previously described. Thus the power transmission mechanism 74 serves a dual function, first to operate the jack mechanism 117 for positioning the table 27 at precisely 45° of angular movement with respect to the frame 16 in each cycle of operation and, secondly, to subsequently actuate the locking keys 45 projectively whereby each engages its respective operating tool 43 to make certain that it is brought into exact alinement with the workpiece carried on the table 27. The operation of the apparatus 15 and its electrical circuits of FIGURE 11 will now be described.

*Operation*

For expediency and clarity it is deemed best to first describe one complete cycle of automatic operation beginning at the start of operation of the tools 43 to their next start of operation during which period the table 27 is rotated 45° from one tool station to another, and then discuss the electrical circuits of FIGURE 11 to show just how the various movements of the component mechanisms are governed in sequential order.

It will be assumed that there are seven operating tools 43 positioned at 45° apart, three of which are shown in FIGURE 1. The eighth position is not provided with an operating tool but is left open to provide for the operator's station. Although the present embodiment provides for a maximum of seven operating tools 43, by suitable changes a greater or less number of operating stations may obviously be provided. In the present embodiment if it is desired only one operating tool might be provided or any number not exceeding seven. The eighth station or the operator's station will be assumed to be situated at the bottom of FIGURE 1.

The operator at the eighth station first secures a workpiece blank in the conventional clamping fixture (of which there are eight spaced apart 45° on the table 27) which is then positioned at the eighth station. Each of the conventional clamping fixtures (not shown) is adapted to supportingly secure a workpiece in proper position. The operator then energizes the control system, hereinafter described, to start cyclic operation. At the start all of the tools 43 will advance toward the table 27 as though to perform their individual cyclic operation and then retract to their respective starting positions. As soon as the slowest operating tool 43 has retracted to its starting position the apparatus 15 commences its cyclic operation of moving the table 27 rotatively 45°. The ram 75 is energized first, in a direction to move the casing 76 from an extreme leftward position to its extreme rightward position as shown in FIGURE 4. This is accomplished by limit switches 175 (FIGURE 11) on the tools 43 which close upon full retraction of the tools 43 to the starting position. Closing of these limit switches 175 causes actuation of the solenoid 206 of the hydraulic valve 207 of FIGURE 13 which, as will be explained later in detail, controls the ram 75. The first portion of rightward movement of casing 76 rotates the Geneva wheel 70 (FIGURE 1) in a clockwise direction for retracting the locking keys 45 from the tools 43. When the locking keys 45 have been retracted the last portion of the said rightward movement of the casing 76 permits the roller 140 of the rock arm 132 to ride downwardly on the slope 143 of the cam 141. This permits the rock arm 132 to rotate about its pivot 131 in a counter-clockwise direction which disengages the jack mechanism 117 from the disc wheel 120. As the lever bar 122 reaches the bottom of its downward travel it actuates a double acting limit switch 146. The housing 76 of the ram 75 has now reached the extreme rightward position shown in FIGURE 4. Actuation of the switch 146 initiates high speed rotation of the hydraulic motor 39 by energizing the large and small solenoid actuated hydraulic valves 94 and 99 (FIGURE 12). The table 27 rotates at high speed until the table moves about 35°. At this point the star wheel 108 (FIGURE 1) actuates the limit switch 104 which effects the de-energizing of the large solenoid actuated hydraulic valve 94 of FIGURE 12. The hydraulic motor now operates at low speed because the small solenoid actuated valve 99 of FIGURE 12 is still energized in open position.

The table 27 rotates at low speed from the 35° position to approximately the 45° position at which time the cam 113 on the cam gear 112 (FIGURE 4) actuates the limit switch 116. Actuation of limit switch 116 effects the de-energizing of the small solenoid actuated hydraulic valve 99 of FIGURE 12 thus terminating flow of fluid under pressure to the hydraulic motor 39. The table therefore stops at approximately, but short of, the 45° position. Simultaneously the double acting limit switch 116 effects the actuation of solenoid 208 of the hydraulic valve 207 (FIGURE 13) whereby the ram 75 is energized to move the casing 76 from the extreme rightward position to the extreme leftward position as viewed in FIGURE 4. The initial portion of the leftward movement actuates the jack mechanism 117 to engaged position whereby the lever 122 engages the notch 121 of disc wheel 120 for rotating the disc wheel 120 to the position shown in FIGURE 4 corresponding to the position where the table 27 is moved an angular distance of precisely to 45°, or within 10 seconds of one degree of that amount of rotation. Continued leftward movement of the casing 76 of the ram 75 then actuates the Geneva wheel 70 (FIGURE 1) to project the locking keys 45 into engagement with the tools 43. As soon as the locking keys 45 reach projected position, each key 45 actuates a lever 144 (FIGURE 1) on the respective tool 43 which in turn closes the contacts of a respective one of serially connected limit switches 195 (FIGURE 11). Actuation of all of the limit switches 195 completes the cyclic operation of the table 27 and the operation of all of the limit switches 195 initiates the start of the next succeeding cycle by again starting the cyclic operation of the several tools 43 as above described, the first workpiece which the operator has mounted on the table fixtures now being in position at station A (FIGURE 1). The operator will now place a second workpiece in the clamping fixture at the operator's station while the first operation is being performed on the first workpiece now at station A. During the next succeeding cycle of operation the first workpiece will advance to station B of FIGURE 1 and so on.

When the first workpiece returns to the operator's eighth station all of the tools 43 will have performed their respective operations on it.

In order to explain the operation of the electrical control system for accomplishing automatically the above described functions in their proper sequential order, an electrical circuit system will now be described with reference to the schematic electric diagram shown in FIGURE 11.

Consideration will now be given to a typical electrical circuit system employing all conventional components for controlling the sequential operation of the apparatus 15. Referring to FIGURE 11 the numerals 150, 151 and 152 represent the customary three leads from a conventional three-phase alternating current source of electric energy such as 220 volts of a 60 cycle frequency. A 3-pole single throw manually operated switch, indicated at 153, may be provided as a main power cut-off switch for the entire system. Conventional fuses 154, 155 and 156 may be provided to protect the system from damage due to overload or the like. The numeral 157 indicates a three-phase electric motor M for driving an hydraulic pump for providing a source of fluid under pressure required for operation of the apparatus 15.

The lead lines 150', 151' and 152' are connected to a normally open 4-pole magnetic relay actuated switch generally indicated at 158. The first pole contacts 158a when closed connects lead line 150' with the motor 157. The second pole contacts 158b when closed connects lead lines 151' with the motor 157 and the third pole contacts 158c when closed connects lead line 152' with the motor 157. The electro-magnetic coil for actuating the relay switch 158 is indicated at 158'. The fourth pole contacts 158d when closed serve to hold the relay coil 158' energized after the normally open push-button start switch 159 has momentarily closed its contacts 160 and 161. Assuming that the manually operated switch 153 is closed can be seen that if the relay coil 158' is energized all four switches 158a, 158b, 158c and 158d are closed and the motor 157 will start and continue to run even after the contacts 160 and 161 are opened by the release of push-button switch 159. The source of electric energy for operating the control system including the relay coil 158' will now be described.

A transformer indicated at 162 is provided having its primary circuit connected to leads 150' and 151'. Thus when the manual switch 153 is closed the primary circuit of the transformer 162 will become energized. The secondary winding of the transformer is such as necessary to provide a single phase low voltage source of control circuit power, e.g. 110 volts, for actuating the various control components hereinafter described. One power output lead 163 from the secondary side of the transformer 162 is for convenience designated as a control circuit return line. The other power output lead 164 is designated for convenience as the control circuit feeder line. A fuse 165 is provided to protect the control system from overload.

The feeder line 164 is provided with a manually operated single pole-single throw switch 166 which serves as a main disconnect for the control system and unless hereinafter mentioned will be considered as being in closed position. An ordinary single pole "on-off" push-button switch 167 is provided as an emergency control circuit disconnect and unless otherwise indicated hereinafter will be considered as in closed position. At 168 is a normally open pneumatic pressure actuated single pole switch. Where one or more of the power operating tools 43 (FIGURE 1) are pneumatically driven it is essential that the compressed air supply (not shown) be at a minimum pre-determined pressure which pressure actuates to close the switch 168. The switch 168 thus ensures that the compressed air supply is at adequate pressure as otherwise the control circuit will become open and thus inoperative.

The remaining electrical components of FIGURE 11 will now be identified after which the operation of the entire system will be explained.

At 169 is an electromagnetic switch actuating coil which, when energized, actuates a single pole normally open relay switch 169a to a closed position. At 170 is a single pole normally closed manually operated push-button stop switch for de-energizing coil 169 and the control system and interrupting cyclic operation of the apparatus 15. At 171 is a single pole normally open manually operated push-button start switch which serves upon closing thereof to energize the coil 169 and start the power operating tools 43 into their respective operating cycles which will be described later in further detail.

A normally open single pole hydraulic pressure actuated switch is provided at 172 in the holding circuit of the coil 169. This switch 172 ensures the presence of hydraulic fluid at a predetermined pressure for operating the hydraulic motor 39 and hydraulic ram 75. Failure of hydraulic pressure opens the holding circuit of coil 169 at 172 thereby preventing cyclic operation of the tools 43 and apparatus 15. At 173 is a warning signal light which upon being energized informs the operator that at least one of the clamps (not shown) on the table 27 for holding workpieces is not in proper condition.

Indicated at 174 is an electromagnetic relay coil which operates a three pole relay switch, the first pole switch 174a, in the circuit of the signal light 173, being normally closed, the second pole switch 174b being normally open and the third pole switch 174c being normally open.

The box 175, in series with switch 174b, represents a plurality of normally open spring loaded first microswitches of the single pole type (not shown) one such first microswitch being mounted on each of the power tools 43. Each of these first microswitches is in open position when its respective tool 43 is performing its individual operating cycle. When each tool 43 completes its individual operating cycle and has retracted to its starting position, its respective first microswitch closes. All of the first microswitches on the tools 43 are connected electrically in series relation so that when all tools 43 have completed their individual respective cycles, the box 175 of FIGURE 11 represents a closed connection electrically between points 176 and 177.

Positioned at 178, in the circuit of the control box 175, is an electromagnetic relay actuating coil for actuating a three pole single throw relay switch, the first pole switch at 178a being a normally open holding switch for the coil 178, the second pole switch at 178b being normally open and the third pole switch 178c being normally closed. At 179 is a normally open manually operated push-button switch for actuating the coil 178 and manually starting cyclic operation of apparatus 15 to rotate the table 27 from one position to its next succeeding position as will be described later in detail.

At 180, in the actuating circuit of coil 178, is a manually operated double throw switch which closes contact 181 with contact 182 and simultaneously maintains open circuit relation between contact 183 and contact 184 or, alternatively, connects contact 183 with contact 184 and simultaneously maintains open circuit relation between contact 181 and contact 182. In the position shown in FIGURE 11, the switch 180 permits but one complete cycle of operation of the apparatus 15 and the alternative position permits automatic cyclic operation wherein the next succeeding cyclic movement of the table 27 commences immediately upon the completion of cyclic operations of all tools 43 as will be further described later herein.

The box 212 represents a plurality of first pole normally open relay switches 214c, each operated by an electromagnetic three pole relay actuating coil, one of which is shown at 214 at the bottom of FIGURE 11, for each of the operating tools 43. The first pole switch 214a is a normally open holding switch for the coil 214, the second pole switch 214b is a normally closed switch in the tool starting circuit and the third pole switch 214c is in the control box 212 and is normally open. When an operating tool 43 completes its forward movement (i.e. completes its operation on the workpiece) but has not yet started its retractive movement to complete its cycle, it closes a respective second microswitch 213 which then energizes the respective coil 214 thus closing switches 214a and 214c. When the tool 43 moves retractively its second microswitch 213 opens but the coil 214 remains energized because relay holding switch 214a is then in closed position. The relay switches 214c, there being one for each tool 43 as above explained, are serially connected so that when all of the tools 43 have completed their operation on the respective workpieces, a closed circuit relation is created between points 215 and 216 of box 212. The collection of switches 214c in box 212 is termed a "memory circuit" because it collects and retains the information imparted by each tool 43 regardless of sequence.

The box 185 represents a group of normally open third microswitches of the single pole type connected electrically in serial relation, one such third microswitch (not shown) being mounted on each clamping fixture (not shown) disposed on the table 27. As stated previously these conventional clamping fixtures serve to hold respectively the workpieces and are positioned to maintain the workpieces for operation thereon by the tools 43 (FIGURE 1). Each third microswitch is mounted on its respective clamping fixture and positioned to close when the workpiece is secured properly thereto. Thus when all clamping fixtures are closed properly, the circuit between point 186 and point 187 of FIGURE 11 is closed. From the fact that each of these third microswitches 185 are serially connected it can be readily appreciated that when one or more of the clamping fixtures are in improper condition the respective switch 185 opens the circuit between points 186 and 187.

The circle 188 of FIGURE 11 represents an electrical slip-ring (not shown) mounted in the apparatus 15 for rotation axially with the table 27. The slip-ring 188 is electrically insulated from table 27 or its associated rotatable members in a conventional manner. The slip-ring 188 is electrically connected to point 186 of the serially connected third microswitches of the box 185 and the other lead of the serially connected microswitches of the box 185 is grounded through the table 27 and apparatus 15 as indicated in FIGURE 11.

At 189 is a stationary mounted electrical brush adapted to establish electrical connection to the slip-ring 188 in a conventional manner. The brush 189 is connected to one side of the electromagnetic relay actuating coil 174, as shown, so that the coil 174 is in series with the microswitches 185.

Shown in FIGURE 4 and indicated in FIGURE 11 is a first double-acting spring loaded limit switch 146 positioned below and in alinement for actuation by lever element 122 of the jack 117, the switch 146 having normally closed contacts 191—192, in circuit with the ram solenoid 206, and normally open contacts 193—194 in circuit with the control for the table drive. In the position shown in FIGURE 11 the jack mechanism 117 is engaged to lock the table 27 and thus the spring loaded limit switch 146 closes electrically the contact 191 with contact 192 while simultaneously opening the circuit between contact 193 and contact 194. In the alternative position where the jack mechanism 117 is fully disengaged from the table drive and the lever element 122 thereof lowers to actuate the switch 146, as shown in FIGURE 4, contact 193 establishes closed circuit relation with contact 194 to initiate table drive while simultaneously the circuit between contact 191 and contact 192 is opened. The spring load of the limit switch 146 thus normally urges it toward the position indicated in FIGURE 11.

In FIGURE 11 at 195 is a second double acting spring loaded limit switch similar to that of the above described first limit switch 146. The spring loading of the switch 195 is adapted to urge it to the position indicated in FIGURE 11. A limit switch 195 is installed on at least one of the operating tools 43 (FIGURE 1) and is actuated by the lever 144 engaging with a locking key 45 in the projected position. Thus when the locking keys 45 are withdrawn from the tools 43, the limit switch assumes the position indicated in FIGURE 11 whereby contact 196 is connected to contact 197 in the operating circuit for the table drive and simultaneously the contacts 198, 199, in the tool operating circuit, are open. When the locking keys 45 are projected into the tools 43 the limit switch 195 is actuated whereby contact 198 is connected to contact 199, to initiate operation of the tools 43, while simultaneously the contact 196 is opened with respect to contact 197 to prevent operation of the table drive. A plurality of limit switches 195 is preferably employed, one being installed on each operating tool 43, and connected serially to ensure that all locking keys 45 function properly with respective tools 43 before the tools 43 may start their individual operating cycles.

Circle 200 represents an electromagnetic relay actuating coil for relay switches 200a, 200b and 200c. The first pole switch 200a is normally closed and is in circuit with relay coil 178. The second pole switch 200b is normally open and is a holding switch for relay 200, and the third pole switch 200c is normally closed and is in circuit with the table drive valve 94. The function of the coil 200 and associated relay switches 200a, 200b and 200c will become apparent later herein.

The numeral 116 indicates the double acting limit switch which is actuated by the table positioning control cam 113 of FIGURE 4. The limit switch 116 is spring loaded to urge it toward the position indicated in FIGURE 11. Thus when the cam 113 is in disengaged relation with the limit switch 116 the circuit between contact 201 with contact 202 is closed while simultaneously the circuit between contact 203 and contact 204 is open. When the cam 113 moves into engagement for actuating the limit switch 116 the circuit between the contact 203 and contact 204 is closed while at the same time the circuit between contact 201 and contact 202 is opened. It will be recalled that the actuation of the limit switch 116 serves to terminate the flow of fluid under pressure to the hydraulic motor 39.

The numeral 206 in FIGURE 11 indicates one solenoid for actuating the hydraulic valve 207 of FIGURE 13. When the solenoid 206 is energized the hydraulic valve 207 (FIGURE 13) is actuated in a direction to admit fluid under pressure to the ram 75 for moving the casing 76 thereof in a direction from left to right as viewed in FIGURES 4 and 13 for disengaging jack mechanism 117 and retracting locking keys from the tools 43. However the hydraulic valve 207 is not spring loaded and subsequent de-energizing of solenoid 206 does not move the valve 207 back to closed position.

The numeral 208 in FIGURE 11 indicates another solenoid for actuating the hydraulic valve 207. The valve 207 is of the double acting type as indicated in FIGURE 13. When the solenoid 208 is energized the hydraulic valve 208 is actuated in a direction to admit fluid under pressure to the ram 75 for moving the casing 76 thereof in a direction from right to left as viewed in FIGURES 4 and 13 for engaging jack mechanism 117 and projecting the locking keys 45 into the tools 43. However, as stated previously, the hydraulic valve 207 is not spring loaded and subsequent de-energization of solenoid 208 does not move the valve 207 back to closed position. From this it is apparent that the ram 75 is always energized as the valve 207 is always admitting fluid under pressure to the ram 75 except, of course, during momentary periods when solenoid 206 or 208 shifts the valve. The valve 207 and solenoids 206 and 208 thereof are conventional.

At 94 in FIGURE 11 is indicated the large solenoid actuated valve 94 of FIGURE 12. The energizing of solenoid actuated valve 94 admits fluid under pressure to the hydraulic motor 39 for high speed operation thereof. 99 in FIGURE 11 represents the small solenoid actuated valve 99 of FIGURE 12. The energizing of solenoid actuated valve 99 admits fluid under pressure to the hydraulic motor 39 for low speed operation. Both of the valves 94 and 99 are spring loaded in a direction toward closed position. Thus when the solenoids of the valves 94 and 99 are de-energized the respective valves close.

Limit switch 104 in circuit to relay coil 200, is actuated by the star wheel 108 (FIGURE 1) and is of the spring loaded normally open type. It will be recalled that actuation of the limit switch 104 serves to operate relay coil 200 to cause restricted flow of fluid under pressure to the hydraulic motor 39 for providing slow speed rotation of the table 27 as will be hereinafter further explained. In FIGURE 11 the position of the limit switch 104 is de-actuated.

Circle 205 represents an electromagnetic relay coil which actuates a normally closed relay switch 205a in the table speed control circuit and its function will be described later herein.

At 209 is an electromagnetic relay actuating coil which actuates the normally open relay switch 209a to closed position after the elapse of a predetermined time delay. In effect this means that when the coil 209 is energized a predetermined time elapses before the relay switch 209a is actuated to a closed position. The time delay for actuating the relay switch 209a is primarily for the convenience of the operator so that he may operate stop button 170 to prevent operation of the tools 43 after the apparatus 15 has completed its cycle. In practice a seven second time delay is sufficient for such purpose.

Circle 210 represents an electromagnetic relay actuating coil which actuates a normally open relay switch 210a in the tool operating circuit for a purpose to be described later herein.

Circle 217 represents an electromagnetic relay actuating coil which actuates a normally closed relay switch 217a in the tool operation control circuit for a purpose to be described later herein.

The numeral 218 represents a solenoid in the tool operating circuit which upon actuation causes tool 43 to start its cycle of operation on its respective workpiece. The numeral 219 represents a manually operated double throw switch. When the switch is in position shown in FIGURE 11 the contact 221 is connected with contact 222 while contact 223 is disconnected from contact 224. In this position the associated tool 43 is operative. However if the operator shifts the switch 219 contact 223 closes with contact 224 while contact 221 is disconnected from contact 222 and in this position the associated tool 43 becomes inoperative as will be apparent later.

At this point attention is directed to the dotted line 224 of FIGURE 11. The components shown below this line represent one tool operating group and all are mounted on the first operating tool 43. For the second operating tool 43 a second and similar group of components is connected to the leads 163, 211 and 225 in the same manner as shown for the first group. Likewise additional tool 43 will each have a similar set of control components like that shown below the dotted line 224 of FIGURE 11 and all component groups are connected to the leads 163, 211 and 225 in parallel circuits in the same manner as that shown for the first group.

A discussion of the electrical components of FIGURE 11, in the cyclic operation of the apparatus 15, will now be undertaken.

First it is assumed that the pneumatic pressure is of sufficient magnitude to close the pressure actuated switch 168. Next it is assumed that the cycle of operation begins at the moment the operating tools 43 begin their respective operations on the workpieces. Further it is assumed that the operator desires to employ all of the operating tools 43 and thus the manual switch 219 on each operating tool 43 is in the position illustrated at the bottom of FIGURE 11. In addition it is also assumed that the operator desires automatic operation in which case the manual switch 180 in the tool operation safety control circuit is shifted to close contacts 183 and 184 and open contacts 181 and 182. Thus at the start of the tool operating cycle the final indexing and locking keys are projected into the tools 43, the jack mechanism 117 is in engaged position and the ram 75 is in its extreme leftward position.

The operator first closes the manual switch 153 for energizing the transformer 162. He next presses the push-button switch 159 which energizes the main line relay coil 158'. This results in closing relay switches 158a, 158b and 158c which energizes the motor 157 for driving the hydraulic pump (not shown). At the same time the coil 158' closes relay switch 158d which serves to hold the coil 158' energized continuously after the operator removes manual pressure on the push-button 159 thus breaking connection between contacts 160 and 161. The motor 157 thus energized drives the hydraulic pump (not shown) to provide fluid under pressure for operating the hydraulic motor 39, hydraulic ram 75 and any of the operating tools 43 which may require hydraulic pressure. Hydraulic pressure thus provided also closes the pressure actuated switch 172.

The operator next presses the push-button 171 which closes to energize the relay coil 169 which in turn actuates relay holding switch 169a to closed position. When the operator releases push-button 171 (thus returning it to open position) the relay coil 169 remains energized continuously. The purpose of this arrangement is such that should hydraulic pressure fail at any time the pressure actuated switch 172 will open thus de-energizing all components therebelow as shown in FIGURE 11. At this point it should be mentioned that in normal operations the operator needs only to close push-button switches 159 and 171 momentarily in that order but once.

When the operator closes push-button switch 171 the relay coil 209 is immediately energized because the locking keys 45 being in projected position the limit switch 195 is in the alternate position to that shown in FIGURE 11. Thus the contact 198 is connected to contact 199 and therefore the relay coil 209 is in closed circuit relation to feeder line 226 and return line 163. After the predetermined time delay has expired the relay switch 209a closes which energizes relay coil 210. Energizing of coil 210 immediately closes relay switch 210a which now connects the feeder line 226 to the line 211 leading to each of the operating tools 43. The manual switches 219 are, as previously assumed to be, in the position shown in FIGURE 11 and thus the solenoid 218 is energized on each tool 43 because relay switch 214b is normally closed (relay coil 214 is not energized at this point). Energizing of the solenoid 218 on each tool 43 starts the cycle of operation of each individual tool 43 which now progresses to completion.

As each of the tools 43 moves forwardly to commence its respective operation it de-actuates to open position its respective first micro-switch in the box 175 of FIGURE 11. However this has no effect at this point because of the fact that relay coil 214 on each tool 43 is de-energized and thus the relay switches 214c of the box 212 are open. Now as each tool 43 completes its forward movement the operation on their workpieces will have been completed and it remains only for the tools 43 to retract to the starting position to complete their respective cycle. When each tool 43 reaches its most forward position it actuates its respective second microswitch 213 to closed position. Closing of the second microswitch 213 on each tool 43 now energizes the respective relay coil 214. When the relay coil 214 associated with one tool 43 is energized it closes relay hold switch 214a, opens relay switch 214b and closes its respective relay switch 214c in the tool cycle memory circuit of the box 212. Now as the tool 43 begins its retractive movement its second microswitch 213 will open but the relay coil 214 remains energized because relay hold switch 214a is now closed. The opening of relay switch 214b de-energizes solenoid 218 to permit retracting the tool 43 back to its starting position. Since relay switches 214c in control box 212 are connected serially, when the last tool 43 has energized its respective relay coil 214 then a closed circuit relation between point 215 and point 216 of the memory circuit box 212 is completed. However the relay coil 178 is not yet energized because the first microswitches 175, one on each tool 43, are still open. As each tool 43 retracts to its starting position it closes its respective first microswitch of the box 175. When the last tool 43 is retracted to its starting position its respective first microswitch of box 175 closes and the circuit between points 176 and 177 is closed because all of the microswitches in box 175 are serially connected. At this point the relay coil 178 becomes energized because switch 180 is in position closing contacts 183—184 as aforesaid but a discussion is now in order to explain the closing of relay switch 174b in the circuit of coil 178.

As explained previously the box 185 of FIGURE 11 represents a group of serially connected normally open third microswitches, one such third microswitch being mounted on each conventional clamping fixture (not shown) on the table 27. The clamping fixtures serve to hold respectively the workpieces in position on the table 27 for operation thereon by the tools 43. When the workpiece is properly secured in the clamping fixture its respective third microswitch is actuated to closed position. Thus when all of the clamping fixtures are properly securing their respective workpieces the circuit between point 186 and 187 of box 185 (FIGURE 11) is closed. This results in the closing of the circuit through slip-ring 188 and brush 189 to energize the relay coil 174 which serves as a fixture clamp safety means. Energizing relay coil 174 opens relay switch 174a which extinguishes the warning signal light 173, closes relay switch 174b to facilitate energizing the relay coil 178 and closes relay switch 174c in the table drive circuit. Opening relay switch 174a extinguishes signal light 173 indicating to the operator that all clamping fixtures are properly secured to the workpieces. Closing of relay switch 174c has no effect at this time because the table positioning and locking operation of the jack mechanism 117 has released the double-acting limit switch 146 and thus the circuit between contact 193 and contact 194 is open as indicated in FIGURE 11.

Returning now to the energization of relay coil 178, this actuates relay holding switch 178a to closed position, closes relay switch 178b in the first ram operating circuit to solenoid 206 and opens relay switch 178c in the second ram operating circuit to solenoid 208. Closing of relay switch 178a has no effect because the manual switch 180 has been, by previously mentioned assumption, shifted to position for automatic operation and thus the contact 181 is disconnected from contact 182. Closing of relay switch 178b now energizes the solenoid 206 for shifting the hydraulic valve 207 (FIGURE 13) in a direction to pressurize the ram 75 whereby the casing 76 moves from left to right as viewed in FIGURE 4 to withdraw keys 45 and retract the jack 122. At the same time the relay switch 178c opens which de-energizes solenoid 208 of the valve 207 (FIGURE 13) thereby permitting the casing 76 of the ram 75 to move rightwardly as above described. Also opening of relay switch 178c de-energizes relay coil 205 which controls the table drive circuit. De-energizing of coil 205 closes relay switch 205a but is ineffective because the locking keys 45 are still in projected condition and thus contact 196 is disconnected from contact 197 by double throw switch 195. Also, at this time switch 116 is in actuated position closing contacts 203—204 because worm cam 113 is still engaged.

As mentioned above the solenoid 206 of the hydraulic valve 207 (FIGURE 13) is now energized and the casing 76 of the ram 75 begins to move rightwardly. Now as the casing 76 begins to move rightwardly the first portion of its movement retracts the locking keys 45 from the operating tools 43 as previously explained. Retraction of the locking keys 45 allows the limit switch 195 in each of the operating tools 43 to assume the normal position shown in FIGURE 11. However closing of contact 196 with contact 197 by operation of the limit switch 195 just described does not complete any circuit at this time because limit switch 146 has not yet been actuated by the jack mechanism 117 to close contacts 193—194. Actuation of relay switch 178c to open position also precludes the energizing of relay coil 205 and solenoid 208 of the valve 207.

Now as the casing 76 of the hydraulic ram 75 continues its rightward movement, as explained previously, the last portion of its movement retracts the jack mechanism 117 which now actuates the limit switch 146 to the position opposite that shown in FIGURE 11. Thus contact 193 closes with contact 194 and simultaneously opens the connection between contacts 191 and 192 thereby de-energizing solenoid 206. De-energizing of solenoid 206 of the valve 207 (FIGURE 13) is ineffective to move the valve because the valve 207 is not spring loaded as mentioned previously. Thus the ram 75 continues to be energized for completion of the movement of the casing 76 in a rightward direction to fully withdraw the jack 122. Closing of contact 193 with contact 194 of limit switch 146 when the jack 122 reaches its bottom position now energizes the large solenoid actuated hydraulic valve 94 (FIGURE 12) and the small solenoid actuated hydraulic valve 99, relay contacts 174c, 205a and 200c all being closed. This results in energizing the hydraulic motor 39 to rotate the table 27 at high speed. However referring to FIGURE 1 it will be seen that a knob on the star wheel 108 is in a position where the normally open limit switch 104 is actuated to a closed position which is the condition at the time when the hydraulic motor 39 is first energized. Referring back to FIGURE 11 the limit switch 104 initially is in closed position. During this same initial period when the hydraulic motor 39 starts, the cam 113 (FIGURE 4) is in switch actuating position which means that its associated limit switch 116 is in the position opposite to that shown in FIGURE 11 whereby contact 201 is disconnected from contact 202, thereby opening the circuit to relay coil 200, and contact 203 is connected to contact 204. Thus, although the star wheel actuated limit switch 104 may be closed at this time, the relay coil 200 is not energized due to disconnection between contact 201 and contact 202. However as the hydraulic motor 39 begins to rotate the table 27 the limit switch 116 disengages from the cam 113 and closes contact 201—202 after the star wheel 108 has moved far enough to de-actuate or open its limit switch 104. Thus relay coil 200 remains de-energized. During this momentary period, at the start of table rotation, the solenoid 208 of the valve 207 (FIGURE 13) and relay coil 205 are not energized because relay switch 178c is still in open position due to energization of relay coil 178 by the tool safety control circuit previously explained.

The hydraulic motor 39 continues to rotate the table 27 at high speed until the next succeeding knob on the star wheel 108 actuates the limit switch 104 to closed position. At this point it will be observed that the limit switch 116 has been disengaged from the cam 113, and contacts 201 and 202 of switch 116 are closed which energizes relay coil 217. Energizing of relay coil 217 opens relay switch 217a in the tool circuit lead 225 which in turn de-energizes relay coils 214 on the tools 43. De-energizing the coil 214 opens relay holding switch 214a, closes relay switch 214b and opens relay switch 214c in memory circuit box 212 for each of the tools 43. Opening of relay switch 214a prevents re-energizing coils 214 until movement of its respective tool 43 again closes its second microswitch 213 as previously explained. Closing of relay switch 214b is ineffective because the open relay switch 210a prevents energization of solenoid 218 thus precluding the start of cyclic operation of tool 43. Opening of relay switch 214c disconnects the circuit between point 215 and 216 of the memory circuit of box 212 (FIGURE 11). The opening of the circuit between points 215 and 216 of the box 212 now de-energizes relay coil 178.

De-energizing relay coil 178 opens relay holding switch 178a, opens relay switch 178b in the circuit to the ram operating solenoid 206 and closes relay switch 178c in the second ram operating circuit. Opening of relay switch 178a is ineffective because the manual switch 180 is in automatic operation position and thus contact 181 is disconnected from contact 182. Opening of relay switch 178b is also ineffective because the jack mechanism 117 is already retracted and thus the contact 191 is open with respect to contact 192. Closing of relay switch 178c is also ineffective for the time being because the limit switch 116 is disengaged from the cam 113 and thus contact 203 is disconnected from contact 204.

As soon as the motor 39 has rotated the table 27 at high speed through about 35° from its starting position, the next knob on the star wheel 108 actuates the limit switch 104 to closed position. Closing of limit switch 104 now energizes relay coil 200, opens relay holding switch 200a, closes relay switch 200b and opens relay switch 200c. Opening of relay switch 200a is ineffective because relay coil 178 is already de-energized because the memory box circuit 212 is open as previously explained. Opening of relay switch 200c de-energizes the large solenoid actuated hydraulic valve 94 (FIGURE 12) to closed position and thus the hydraulic motor 39 now moves at low speed because the source of fluid pressure thereto is restricted to flow through the small solenoid actuated hydraulic valve 99 which is still energized. Closing of relay holding switch 200b is effective to maintain the coil 200 energized after limit switch 104 is released to normally open position by star wheel 108 moving past the switch.

The hydraulic motor is now rotating the table 27 at low speed, beginning at about 35° from the initial position. When the table 27 is rotated to approximately 45° from the initial position the cam 113 actuates the limit switch 116 to the position opposite that indicated in FIGURE 11. Thus contact 203 closes with contact 204 and at the same time contact 201 is disconnected from contact 202. Disconnection of contact 201 with respect to contact 202 de-energizes relay coils 200 and 217. De-energizing of coil 217 closes tool circuit relay switch 217a but at the moment this is ineffective because relay coils 214 associated with the tools 43 are already de-energized. De-energizing of coil 200 closes relay switch 200a, opens relay hold switch 200b and closes relay switch 200c. Closing relay switch 200a is ineffective because memory box 212 is in open circuit condition as previously explained. Closing of relay switch 200c is also ineffective to operate solenoid 94 because the actuation of the limit switch 116 by the cam 113 closes contact 203 with contact 204 which energizes relay coil 205 and solenoid 208. The energizing of coil 205 opens relay switch 205a in the table drive circuit to the solenoid actuated valves 94 and 99 of FIGURE 12 allowing both valves to be closed. Thus the hydraulic motor 39 is shut down and the table 27 stops at approximately 45° from initial position.

As explained above the cam 113 has now actuated the limit switch 116 to the position opposite that shown in FIGURE 11. Thus the coil 205 is energized, the effect of which was explained above, and solenoid 208 is simultaneously energized. The solenoid 208 now shifts the hydraulic valve 207 of FIGURE 13 to the position for pressurizing the ram 75 in a direction to move the casing 76 thereof from right to left as viewed in FIGURE 4 to precisely index the table 27 with the tools 43 and lock the table position. The initial leftward movement of the casing 76 actuates the jack mechanism 117 whereby the lever element 122 thereof elevates to engage the notch 121 of the disc wheel 120 to the position shown in FIGURE 4 which through the worm 33 adjusts the position of the table 27 precisely at 45° from its initial position and locks it in this new position. As the lever element 122 of the jack mechanism 117 elevates as previously described, it disengages from its limit switch 146 and the contacts thereof assume the position shown in FIGURE 11. Closing of contact 191 with contact 192 has no effect however, because relay coil 178 is already de-energized and thus relay switch 178b is open.

After the casing 76 of the ram 75 has moved leftwardly to the point where the jack mechanism 117 is actuated to its engaged position, further leftward movement of the casing 76 actuates the projection of locking keys 45 into the operating tools 43 in the manner previously explained. As soon as the locking keys 45 are fully projected (i.e. when the casing 76 of the ram 75 has moved to its extreme leftward position as viewed in FIGURE 4) the actuating lever 144 (FIGURE 1) of the double acting limit switch 195 on each tool shifts the switch 195 to the position opposite that indicated in FIGURE 11. Both solenoid 208 of valve 207 (FIGURE 13) and relay coil 205 remain energized at this time because contacts 203—204 of table positioning switch 116 are closed. Shifting of the limit switch 195 on the operating tools 43 opens contact 196 with respect to contact 197 and positively opens the table drive circuit to prevent its operation until the start of the next cycle of table movement. Closing of contact 198 with contact 199 of limit switch 195 now energizes the delayed action relay coil 209. After the expiration of the predetermined time delay the relay switch 209a closes. As soon as the time delay relay switch 209a closes the relay coil 210 becomes energized. Energization of relay coil 210 closes relay switch 210a to energize the main feeder line 211 of the tool operating circuit which now energizes the tool solenoids 218, there being one on each tool 43, and the tools 43 commence to actuate thus beginning the next succeeding cycle of operation of the apparatus 15.

Now while the tools 43 are performing their respective operations, the operator positioned in the eighth station opens the clamping fixture at that station to remove the finished workpiece (i.e. all of the tools 43 have performed their respective operations on the finished workpiece) and inserts a blank workpiece and again secures the clamping fixture. When the operator opens the clamping fixture the circuit between points 186 and 187 of box 185 in the clamp safety circuit (FIGURE 11) is opened and thus the relay coil 174 becomes de-energized during this period. De-energizing of coil 174 closes relay switch 174a, opens relay switch 174b in the tool safety circuit and opens relay switch 174c in the table drive circuit. Closing of relay switch 174a results in illuminating the signal light 173 to inform the operator that at least one of the clamping fixtures is not properly closed. At this time the circuit between points 176 and 177 of the switch box 175 in the tool safety circuit is open because the tools 43, being in operation, are not in retracted position to close their respective first microswitches 175.

In the event that the operator desires to operate the cyclic movement of the table by individual cycles he shifts the manual switch 180 to the position corresponding to that of FIGURE 11 which by-passes the tool operation memory system 212 used for automatic operation. Thus when the push-button 171 is operated, and assuming the respective tool switches 219 are in "on" position, the tools 43 will operate through their respective operation cycles. As soon as all the tools 43 have completed their operations and retracted to starting position the microswitches in the safety circuit box 175 will all be closed. However the cyclic movement of the table 27 will not start because the coil 178 remains de-energized. This is due to the fact that the contact 183 is open with respect to contact 184 of manual switch 180, relay hold switch 178a is open and push-button 179 is open. The operator now closes the push-button 179 momentarily which energizes the coil 178. Energizing of coil 178 closes relay hold switch 178a, closes relay switch 178b in the jack retracting circuit and opens relay switch 178c in the jack elevating circuit. Closing of relay switch 178b now actuates the solenoid 206 (FIGURE 13) for moving the casing 76 of ram 75 in a direction from left to right (FIGURE 4) which retracts the locking keys 45 and disengages the jack mechanism 117. Opening of relay switch 178c at this time prevents energizing of solenoid 208 of hydraulic valve 207 for elevating the jack.

The cycle of operation of the apparatus 15 for rotating the table 27 having been started by the operation of push-button 179 continues throughout its cycle in the same manner as outlined for automatic operation with the following exception. When the star wheel 108 actuates its limit switch 104 to closed position the relay coil 200 becomes energized which opens relay switch 200a. Opening of relay switch 200a de-energizes coil 178. As soon as the coil 178 becomes de-energized the relay hold switch 178a opens. Thereafter the relay coil 178 remains de-energized until the operator again operates the push-button switch 179 to closed position or, in the alternative, shifts the manual switch 180 to the position, opposite that shown in FIGURE 11, for automatic operation. Thus when the cyclic operation of the table 27 has been completed the tools 43 will automatically again operate throughout their respective cycles, the locking key actuated switches 195 having closed their contacts 198—199 to energize relay 210 and thus close switch 210a in the tool drive circuit. However when the tools 43 have completed their operations and returned to starting position the next cyclic movement of the table 27 will not start unless switch 180 has been shifted to close contacts 183—184 for the reason described above.

In the event the operator desires to omit the operation of one or more of the tools 43, he shifts the manual switch 219, on each of the tools 43 to be idled, to the "off" position. The shift of switch 219 to the "off" position, opposite that shown in FIGURE 11, prevents actuation of the solenoid 218 which solenoid normally operates to energize the cyclic operation of each tool 43. At the same time the manual switch 219 closes contact 223 with contact 224 which in effect by-passes electrically the second microswitches 213 for energizing relay coil 214. Thus relay coil 214 on each idled tool will become energized to close its respective memory circuit switch 214c in box 212 when coil 217 is de-energized upon opening of the table drive circuit. This is necessary because in automatic operation all of the relay switches 214c (one for each tool 43) must close in order to complete the memory circuit in box 212.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A multi-station precision operation workpiece supporting apparatus for transporting a workpiece from one to another of a plurality of operating tools disposed adjacent to said apparatus in successively operative positions with respect to the path of workpiece travel, said apparatus comprising a power driven rotatable table for rigidly supporting and moving said workpiece from a first operating tool station to a second operating tool station when said first operating tool has completed its operation on said workpiece, means for supporting each of said tools independently of said table and for limited lateral resilient movement, means in said apparatus for controlling rotation of said table for moving said workpiece from said first operating tool station to said second operating tool station and indexing said table with respect to said second tool station, and projectable-retractable tool positioning and locking keys mounted in said apparatus, said tool positioning and locking keys being projectable from said table at each of said stations and into interlocking relation with the respective operating tool support for adjusting said tool laterally into precise radial relation with the respective key.

2. A multi-station precision operation workpiece supporting apparatus for moving a workpiece from one to another of a plurality of operating tools disposed adjacent to said apparatus in successively operative positions with respect to the path of workpiece travel, said apparatus comprising a power driven rotatable table for fixedly supporting and moving said workpiece from a first operating tool station to a second operating tool station when the first operating tool has completed its operation on said workpiece, means for supporting each of said tools independently of said apparatus and for limited resilient lateral movement, means in said apparatus for controlling rotation of said table for moving said workpiece from said first operating tool station to said second operating tool station and indexing and locking said table with respect to said second tool station, projectable-retractable tool positioning and locking keys mounted in said apparatus, a tool positioning and locking key being projectable from said table at each of said stations and into interlocking relation with the respective operating tool support for adjusting said tool laterally into precise radial relation with the respective key and in locked relation with respect to said table, and a power transmission mechanism and control means therefor in said apparatus operative for actuating said tool positioning and locking keys projectively after said table has moved said workpiece to the position of said second operating tool station and has become locked thereat and for actuating said tool positioning and locking keys retractively only after said operating tool has completed its operation on said workpiece.

3. A multi-station precision operation workpiece supporting apparatus for moving a workpiece from one to another of a plurality of individually supported operating tools stationed adjacent to said apparatus in successive operative positions with respect to the path of said workpiece, said apparatus comprising a frame supporting a rotatable table, said table being adapted for supporting a workpiece and moving said workpiece from a first operating tool station to a second operating tool station when the first operation tool has completed its operation on said workpiece, a worm gear connected to said table and constrained for rotation therewith, a worm shaft connected to said frame in journalled relation, a worm wheel mounted on and constrained for rotation with said worm shaft in meshed relation with said worm gear, a motor mounted in rigid relation with respect to said frame, said motor having a rotatable member in drive relation to said worm wheel, a disc wheel mounted on and constrained for rotation with said worm shaft, said disc wheel having a radial shoulder on the outer periphery thereof, a jack mechanism mounted in rigid relation to said frame, said jack mechanism having a lever element positioned to engage said shoulder and turn said worm shaft for vernier adjusting and locking said table with respect to said frame precisely at each of said tool stations, means in said apparatus for controlling rotation of said table for moving said workpiece from said first operating tool station to said second operating tool station, projectable-retractable tool positioning and locking keys mounted in said table, said keys being projectable from said table at each of said stations and into interlocking relation with the respective operating tool support for adjusting said tool laterally into precise radial relation with the respective key and in locked relation with said table, a reversible power transmission mechanism mounted on said frame and control means therefor, said power transmission mechanism and control means being adapted to actuate said jack mechanism lever element to engage said shoulder of said disc wheel and thereafter actuate said keys projectively when said table has moved to said second operating tool station, said control means and power transmission mechanism being operable for actuating the lever element of said jack mechanism into disengaged relation with said disc wheel only after actuation of said keys retractively.

4. A multi-station precision operation workpiece supporting apparatus for moving a workpiece from one to another of a plurality of operating tools stationed adjacent to said apparatus in successive operative positions with respect to the path of said workpiece, said apparatus comprising a frame supporting a rotatable table, said table being adapted for supporting and moving said workpiece from a first operating tool station to a second operating tool station when said first operating tool has completed its operation on said workpiece, an individual support for each of said tools and each support having a keyway opening radially toward said table, angularly spaced radially projectable-retractable tool positioning and locking keys mounted on said table, said keys being projectable at each of said tool stations and into interlocking relation with the keyway of the respective operating tool for adjusting said tool laterally into precise radial relation the respective key with and in locked relation with said table, a power transmission mechanism mounted on said frame and control means therefor for actuating said keys projectively only after said table has moved said workpiece from said first operating tool station to said second tool station and to actuate said locking keys retractively only after said tool has completed its operation on said workpiece.

5. A multi-station precision operation workpiece supporting apparatus for moving a workpiece from one to another of a plurality of operating tools disposed adjacent to said apparatus stations in successive operative positions with respect to the path of said workpiece, said apparatus comprising a frame supporting a rotatable table, said table being adapted for supporting and moving said workpiece from a first operating tool station to a second tool operating station when the first operating tool has completed its operation on said workpiece, a worm gear connected to said table and constrained for rotation therewith, a worm shaft connected to said frame in journalled relation, a worm wheel mounted on and constrained for rotation with said worm shaft in meshed relation with said worm gear, a rotatable fluid motor mounted in rigid relation with respect to said frame and connected to drive said worm shaft, a source of fluid under pressure connectable for energizing said fluid motor, a large hydraulic valve disposed in said apparatus and connected to communicate said source of fluid pressure to said motor for energizing said motor at high speed, a small hydraulic valve disposed in said apparatus and connected in parallel with the large valve to communicate restrictively said source of fluid pressure to said motor for energizing said fluid motor at low speed, a first control means for operating said valves to energize said motor for rotating said table initially at high speed followed by low speed when said workpiece is moved from said first operating tool station to said second operating tool station, means for stopping said fluid motor when said workpiece has reached said second station, a support for each of said tools and each support having a keyway opening radially toward said table, each of said tool supports being capable of limited resilient lateral movement, projectable-retractable tool positioning keys mounted on said apparatus, said keys being projectable radially at each of said stations and into interlocking relation with the keyway of the respective operating tool for adjusting said tool laterally into precise radial relation with the respective key, a reversible fluid power transmission mechanism mounted on said frame and a second control means therefor for operating said mechanism in one direction to actuate said keys projectively when said table has moved said workpiece to said second operating tool station and after said fluid motor has stopped, and means for reversing said transmission mechanism to actuate said keys retractively when said operating tool has completed its operation on said workpiece.

6. A multi-station precision operation workpiece supporting apparatus for moving a workpiece from one to another of a plurality of operating tools disposed adjacent to said apparatus stations in successive operative positions with respect to the path of said workpiece, each of said tools being mounted for limited resilient lateral movement, said apparatus comprising a frame supporting a rotatable table, said table being adapted for supporting and moving said workpiece from a first operating tool station to a second operating tool station when the first operating tool has completed its operation on said workpiece, a worm gear connected to said table and constrained for rotation therewith, a worm shaft connected to said frame in journalled relation, a worm wheel mounted on and constrained for rotation with said worm shaft in meshed relation with said worm gear, a rotatable fluid motor mounted in rigid relation with respect to said frame and connected to drive said worm shaft, a source of fluid pressure connectable for energizing said fluid motor, a large hydraulic valve disposed in said apparatus and connected to communicate said source of fluid pressure to said motor for energizing said motor to rotate said table at high speed, a small hydraulic valve disposed in said apparatus and connected in parallel with the large valve to communicate restrictively said source of fluid pressure to said motor for energizing said motor to rotate said table at low speed, a first control means for operating said valves to energize said motor to rotate said table initially at high speed and then low speed when said workpiece is moved from said first operating tool station to said second operating tool station, means for stopping said fluid motor when said workpiece has reached the second station, projectable-retractable tool positioning keys mounted on said apparatus and constrained to travel with said table, said keys being projectable at each of said stations and into engaging relation with the respective operating tool for adjusting said tool laterally into precise radial relation with the respective key, and a reversible fluid power transmission mechanism mounted on said frame and a second control means therefor for projecting and retracting said keys, said mechanism being operative to actuate said keys projectively only when said table has moved said workpiece to said second operating tool station and after said motor has stopped and to actuate said locking keys retractively only when said operating tool has completed its operation on said workpiece.

7. A multi-station precision operation workpiece supporting apparatus for moving a workpiece from one to another of a plurality of operating tools disposed adjacent to said apparatus in successively operative positions with respect to said workpiece, each of said tools being mounted on an independent support capable of limited lateral resilient movement, said apparatus comprising a frame supporting a rotatable table, said table being adapted for supporting and moving said workpiece from a first operating tool station to a second operating tool station when the first operating tool has completed its operation on said workpiece, a worm gear connected to said table and constrained for rotation therewith, a worm shaft connected to said frame in journalled relation, a worm wheel mounted on and constrained for rotation with said worm shaft in meshed relation with said worm gear, a rotatable fluid motor mounted in rigid relation with respect to said frame and connected to drive said worm shaft, a source of fluid pressure for energizing said fluid motor, a disc wheel mounted on and constrained for rotation with said worm shaft, said disc wheel having a radial shoulder on the outer periphery thereof, a large hydraulic valve disposed in said apparatus and connected to communicate said source of fluid pressure to said motor for energizing said motor to rotate said table at high speed, a small hydraulic valve disposed in said apparatus and connected in parallel with the large valve to communicate restrictively said source of fluid pressure to said motor for energizing said motor to rotate said table at low speed, a first control means for operating said valves to energize said motor for rotating said table initially at high speed and then at low speed as said workpiece is moved from said first operating tool station to said second operating tool station, said first control means stopping said motor when said workpiece is at said second station, a jack mechanism mounted in rigid relation to said frame, said jack mechanism having a lever element positioned to engage the radial shoulder of said disc wheel for vernier adjusting and locking said table to said frame at said second station when said motor is stopped, a plurality of angularly spaced radially projectable-retractable tool positioning keys mounted to travel with said table, said keys being projectable at each of said stations and into engaging relation with the respective operating tool support for adjusting said tool into precise radial relation with the respective key and in locked relation with said table, a fluid power transmission mechanism mounted on said frame, said transmission being operatively connected to actuate said jack mechanism and engage said lever element with said radial shoulder on said disc wheel and thereafter actuate said keys projectively when said table has moved said workpiece to said second operating tool station, and a second control means for actuating said fluid power transmission mechanism in sequence relation with respect to said fluid motor and said first control means.

8. A multi-station precision operation workpiece supporting apparatus for moving a workpiece from one to another of a plurality of operating tools disposed adjacent to said apparatus in successively operative positions with respect to the path of said workpiece, said apparatus comprising a power driven rotatable table shiftable from an indexed position relative to a first operating tool station to an indexed position with respect to a second operating tool station, means for rotating said table from station to station, a power operated jack mechanism mounted in said apparatus, said jack mechanism being disposed to engage the last named means and shift said table to final indexed relation with respect to said second tool station, and control means for said power driven table and said jack mechanism whereby said table rotates at a greater speed initially when moving away from said first operating tool station and at a lesser speed when approaching said second operating tool station, said control means operating to stop said table when said table is at a substantially indexed position at said second station and thereafter to actuate said jack mechanism for vernier adjustment of said table rotatively to move the table to precisely indexed position at said second operating station.

9. A multi-station precision operation workpiece supporting apparatus for moving a workpiece from one to another of a plurality of operating tools disposed adjacent to said apparatus in successive operative positions with respect to the path of said workpiece, said apparatus comprising a power driven rotatable table shiftable from a first operating tool station to a second operating tool station, drive means for rotating said table from station to station, a power operated jack mechanism mounted in said apparatus, said jack mechanism being disposed to engage said drive means and to shift said table independently to a final indexed position with respect to the second said tool station, and control means for said power driven table and said jack mechanism whereby said table is rotated from said first operating tool station to substantially said second operating tool station by said drive means and then stopped and thereafter said jack mechanism is actuated for vernier adjustment of said table rotatively to move said table to final indexed position at said second operating station.

10. A multi-station precision operation workpiece supporting apparatus for moving a workpiece from one to another of a plurality of operating tools disposed adjacent to said apparatus in successive operative positions with respect to the path of a workpiece thereon, each of said tools being mounted for limited resilient lateral movement, said apparatus comprising a power driven rotatable table shiftable from a first operating tool station to a second operating tool station, drive means for rotating said table from station to station, a power operated jack mechanism mounted in said apparatus, said jack mechanism being operative to engage said drive means and to shift said table independently to final indexed relation with respect to said second tool station, control means for said power driven table and said jack mechanism whereby said table is rotated at a greater speed initially when moving away from said first station and at a lesser speed when approaching said second station, said control means being operative to stop said table drive means when the table is substantially at the second station and thereafter to actuate said jack mechanism for vernier adjustment of said table rotatively to move said table to a final indexed position relative to said second station, a plurality of projectable-retractable tool positioning keys mounted on said table, said keys being projectable from said table at each of said stations and into engaging relation with the respective operating tool for adjusting said tool laterally into precision radial alinement with the respective key.

11. A multi-station precision operation workpiece supporting apparatus for moving a workpiece from one to another of a plurality of operating tools disposed adjacent to said apparatus in successive operative positions with respect to the path of said workpiece, each of said tools being mounted for limited resilient lateral movement, said apparatus comprising a rotatable table for supporting and moving said workpiece from a first operating tool station to a second operating tool station when the first operating tool has completed its operation on said workpiece, drive means for rotating said table from station to station, a power operated jack mechanism mounted in said apparatus, said jack mechanism being operative to engage said drive means and independently shift said table to final indexed position with respect to said second tool station, means in said apparatus for stopping rotation of said table when said workpiece is substantially at said second operating tool station, a plurality of angularly spaced projectable-retractable tool positioning keys mounted on said table, said keys being projectable at each of said stations and into engaging relation with the respective operating tool for adjusting said tool laterally into precise radial relation with the respective key, a power transmission mechanism and control means therefor in said apparatus positioned to actuate said jack mechanism after said table rotation is stopped for vernier adjustment of said table rotatively to index said table to said second station and lock said table against further movement, and means operated by said transmission after actuation of said jack for actuating said locking keys projectively to engage said operating tools and adjust them individually whereby each operating tool is positioned in precise radial relation with the respective key tool operating station.

References Cited in the file of this patent
UNITED STATES PATENTS

| | | |
|---|---|---|
| 1,529,267 | Myers | Mar. 10, 1925 |
| 1,938,107 | Lovejoy | Dec. 5, 1933 |
| 2,748,624 | Costello | June 5, 1956 |
| 2,845,639 | Jorgensen | Aug. 5, 1958 |